US012726245B2

(12) United States Patent
Yang et al.

(10) Patent No.: US 12,726,245 B2
(45) Date of Patent: Sep. 1, 2026

(54) SIGNAL RECEIVING METHOD, SENDING METHOD, TERMINAL, NETWORK DEVICE AND STORAGE MEDIUM

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Yuwan Su, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 471 days.

(21) Appl. No.: 18/261,665

(22) PCT Filed: Jan. 17, 2022

(86) PCT No.: PCT/CN2022/072272

§ 371 (c)(1),
(2) Date: Jul. 14, 2023

(87) PCT Pub. No.: WO2022/152286

PCT Pub. Date: Jul. 21, 2022

(65) Prior Publication Data

US 2024/0072864 A1 Feb. 29, 2024

(30) Foreign Application Priority Data

Jan. 15, 2021 (CN) ........................ 202110055822.X

(51) Int. Cl.
*H04L 5/00* (2006.01)
*H04B 7/06* (2006.01)

(52) U.S. Cl.
CPC ......... *H04B 7/0626* (2013.01); *H04L 5/0048* (2013.01)

(58) Field of Classification Search
None
See application file for complete search history.

(56) References Cited

U.S. PATENT DOCUMENTS

2019/0052379 A1* 2/2019 Lin ........................ H04L 5/0048
2019/0260532 A1* 8/2019 Manolakos ........... H04L 5/0094
(Continued)

FOREIGN PATENT DOCUMENTS

CN 110391882 A 10/2019
CN 110475319 A 11/2019
(Continued)

OTHER PUBLICATIONS

Extend search report from corresponding European Patent Application No. 22739161.2 dated Nov. 18, 2025.
(Continued)

*Primary Examiner* — Fahmida S Chowdhury
(74) *Attorney, Agent, or Firm* — Ladas & Parry, LLP

(57) ABSTRACT

The present disclosure discloses a signal receiving method, a signal sending method, a terminal, a network device and a storage medium, the method includes determining, by a terminal, a time domain position of a first signal according to time domain information of a target reference signal; receiving, by the terminal, the first signal according to the time domain position of the first signal.

20 Claims, 10 Drawing Sheets

(56) References Cited

U.S. PATENT DOCUMENTS

| | | | | |
|---|---|---|---|---|
| 2019/0305830 | A1* | 10/2019 | Zhou | H04B 7/06964 |
| 2020/0052942 | A1 | 2/2020 | Lin et al. | |
| 2020/0154446 | A1* | 5/2020 | Yerramalli | H04W 56/001 |
| 2020/0304263 | A1 | 9/2020 | Zhang et al. | |
| 2020/0366351 | A1 | 11/2020 | Karjalainen et al. | |
| 2021/0067291 | A1 | 3/2021 | Gao et al. | |
| 2021/0083748 | A1* | 3/2021 | Guan | H04B 7/06956 |
| 2021/0105739 | A1* | 4/2021 | Lin | H04L 5/005 |
| 2021/0135821 | A1* | 5/2021 | Guan | H04L 5/0048 |
| 2021/0167911 | A1 | 6/2021 | Xiao et al. | |
| 2022/0086896 | A1* | 3/2022 | Takahashi | H04W 72/1268 |
| 2022/0116144 | A1* | 4/2022 | Liu | H04L 5/0092 |
| 2022/0124633 | A1* | 4/2022 | Hoshino | H04W 16/28 |
| 2022/0132436 | A1* | 4/2022 | Hoshino | H04B 7/06952 |
| 2022/0286985 | A1* | 9/2022 | Ren | H04J 11/0076 |
| 2022/0330206 | A1* | 10/2022 | Li | H04W 68/025 |
| 2023/0056906 | A1 | 2/2023 | Yang et al. | |
| 2023/0261829 | A1 | 8/2023 | Liu | |
| 2023/0336305 | A1* | 10/2023 | Hakola | H04L 5/0051 |
| 2024/0057046 | A1* | 2/2024 | Mu | H04L 5/0053 |
| 2024/0072864 | A1* | 2/2024 | Yang | H04L 5/0078 |

FOREIGN PATENT DOCUMENTS

| | | | |
|---|---|---|---|
| CN | 111345007 | A | 6/2020 |
| CN | 111903085 | A | 11/2020 |
| CN | 111937450 | A | 11/2020 |
| CN | 113260022 | A | 8/2021 |
| EP | 4236510 | A1 | 8/2023 |
| WO | 2019136640 | A1 | 7/2019 |

OTHER PUBLICATIONS

ZTE: "Reference signal for RRC idle and inactive UEs": 3GPP Draft; R1-2007972, 3rd Generation Partnership Project (3GPP), Mobile Competence Centre; 650, Route Des Lucioles; F-06921 Sophia-Antipolis Cedex; France, vol. RAN WG1, No. e-Meeting; Oct. 26-Nov. 13, 2020 Nov. 1, 2020 (Nov. 1, 2020), XP052349330, Retrieved from the Internet: URL:https://ftp.3gpp.org/tsp_ran/WG1_RL 1/TSGR1_1 03-e/Docs/R1-2007972.zip R1-2007972 Reference Signal for RRC Idle and Inactive UEs.doc [retrieved on Nov. 1, 2020].

Samsung: "Remaining issues on the NR Mobility", 3GPP Draft; R1-1715915 Mobility V1, 3rd Generation Partnership Project (3GPP), Mobile Competence Centre; 650, Route Des Lucioles; F-06921 Sophia-Antipolis Cedex; France, vol. RAN WG1, No. Nagoya, Japan; sep. 18-Sep. 21, 2017 Sep. 17, 2017 (Sep. 17, 2017), XP051339374, Retrieved from the Internet: URL:https://www.3gpp.org/ftp/Meetings_3GPP _SYNCE/RAN1/Docsl [retrieved on Sep. 17, 2017].

Nokia et al: "On paging enhancements for UE power saving", 3GPP Draft; R1-2110311, 3rd Generation Partnership Project (3GPP), Mobile Competence Centre; 650, Route Des Lucioles; F-06921 Sophia-Antipolis Cedex; France, vol. RAN SG1, No. e-Meeting; Oct. 11-Oct. 19, 2021 Oct. 1, 2021 (Oct. 1, 2021), XP052059244, Retrieved from the Internet: URL:https://ftp.3gpp.org/tsg_ran/WG1_RL1/TSGR1_106b-e/Docs/R1-2110311.zip R1-2110311.docx [retrieved on Oct. 1, 2021].

International Search Report for PCT Application No. PCT/CN2022/072272 issued on Mar. 25, 2022 and its English Translation provided by WIPO.

Written Opinion for PCT Application No. PCT/CN2022/072272 issued on Mar. 25, 2022 and its English Translation provided by WIPO.

International Preliminary Report on Patentability for PCT Application No. PCT/CN2022/072272 issued on Jul. 4, 2023 and its English Translation provided by WIPO.

"On measurement requirements for CSI-RS L3 measurement," 3GPP TSG-RAN WG4 Meeting # 95-e, R4-2007356, Electronic Meeting, May 25-Jun. 5, 2020, Source: OPPO, Agenda Item: 6.16.1.4.

First Chinese Office Action and search report for the corresponding Chinese Patent Application No. 202110055822.X issued by the Chinese Patent Office on Jun. 1, 2023 and its English translation provided by the foreign associate.

"Discussion of NR positioning enhancements," 3GPP TSG RAN WG1 Meeting #102, R1-2005712, e-Meeting, Aug. 17-28, 2020, Source: CATT, Agenda item: 8.5.3.

* cited by examiner

SIGNAL RECEIVING METHOD, SENDING METHOD, TERMINAL, NETWORK DEVICE AND STORAGE MEDIUM

CROSS-REFERENCE TO RELATED APPLICATIONS

This application is the U.S. national phase of PCT Application No. PCT/CN2022/072272 filed on Jan. 17, 2022, which claims priorities of the Chinese patent application No. 202110055822.X filed on Jan. 15, 2021, the disclosures of which are incorporated herein by reference in their entireties.

TECHNICAL FIELD

The present disclosure relates to the field of communication technology, in particular to a signal receiving method, a sending method, a terminal, a network device and a storage medium.

BACKGROUND

In some communication systems, a signal of a terminal is mainly configured through radio resource control (RRC) signaling, for example: a tracking reference signal (TRS) or a channel state information reference signal (CSI-RS) are configured by the RRC signaling. The RRC signaling refers to a signaling transmitted by the terminal in the connected state, so that the terminal can only receive these signals in the connected state, resulting in high power consumption of the terminal.

SUMMARY

The present disclosure aims to provide a signal receiving method, a signal sending method, a terminal, a network device and a storage medium, so as to solve the problem of high power consumption of the terminal.

An embodiment of the present disclosure provides a signal receiving method, including: determining, by a terminal, a time domain position of a first signal according to time domain information of a target reference signal; receiving, by the terminal, the first signal according to the time domain position of the first signal.

Optionally, the first signal includes one of the following: a tracking reference signal (TRS), a channel state information reference signal (CSI-RS), and paging early indication (PEI).

Optionally, the target reference signal includes at least one of the following: a paging message, a synchronization signal block (SSB), a TRS, a CSI-RS or PEI; wherein a content included in the first signal is different from a content included in the target reference signal.

Optionally, the time domain position of the first signal has a functional relationship with the time domain information of the target reference signal.

Optionally, the functional relationship between the time domain position of the first signal and the time domain information of the target reference signal includes at least one of the following: a first functional relationship between the time domain position of the first signal and a time domain position of a radio frame where the target reference signal is located; a second functional relationship between the time domain position of the first signal and a time domain position of a subframe where the target reference signal is located; a third functional relationship between the time domain position of the first signal and a time domain position of a slot where the target reference signal is located; a fourth functional relationship between the time domain position of the first signal and a time domain position of a symbol where the target reference signal is located; a fifth functional relationship between the time domain position of the first signal and a time domain position of MO of the target reference signal; a sixth functional relationship between the time domain position of the first signal and a parameter of the time domain position of the radio frame where the target reference signal is located; a seventh functional relationship between the time domain position of the first signal and a parameter of the time domain position of the subframe where the target reference signal is located; an eighth functional relationship between the time domain position of the first signal and a parameter of the time domain position of the slot where the target reference signal is located; a ninth functional relationship between the time domain position of the first signal and a parameter of the time domain position of the symbol where the target reference signal is located; a tenth functional relationship between the time domain position of the first signal and a parameter of the time domain position of the MO of the target reference signal.

Optionally, the determining, by the terminal, a time domain position of a first signal according to time domain information of a target reference signal, includes: determining, by the terminal, the time domain position of the first signal according to time domain information of the target reference signal and a time domain position offset of the first signal.

Optionally, the time domain position of the first signal has a functional relationship with the time domain position offset of the first signal and the time domain information of the target reference signal.

Optionally, the functional relationship between the time domain position of the first signal and the time domain position offset of the first signal and the time domain information of the target reference signal includes at least one of the following; an eleventh functional relationship between the time domain position of the first signal and the time domain position offset of the first signal and a time domain position of a radio frame where the target reference signal is located; a twelfth functional relationship between the time domain position of the first signal and the time domain position offset of the first signal and a time domain position of a subframe where the target reference signal is located; a thirteenth functional relationship between the time domain position of the first signal and the time domain position offset of the first signal and a time domain position of a slot where the target reference signal is located; a fourteenth functional relationship between the time domain position of the first signal and the time domain position offset of the first signal and a time domain position of a symbol where the target reference signal is located; a fifteenth functional relationship between the time domain position of the first signal and the time domain position offset of the first signal and a time domain position of MO of the target reference signal; a sixteenth functional relationship between the time domain position of the first signal and the time domain position offset of the first signal and a parameter of time domain position of the radio frame where the target reference signal is located; a seventeenth functional relationship between the time domain position of the first signal and the time domain position offset of the first signal and a parameter of the time domain position of the subframe where the target reference signal is located; an eighteenth functional relationship between the time domain position of the first signal and the time domain position offset of the first signal and a parameter of the time domain position of the slot where the target reference signal is located; a nineteenth functional relationship between the time domain position of the first signal and the time domain position offset of the first signal and a parameter of the time domain position of the symbol where the target reference signal is located; a twentieth functional relationship between the time domain position of the first signal and the time domain position offset of the first signal and a parameter of the time domain position of the MO of the target reference signal is located.

Optionally, the time domain position includes one of the following: a starting time domain position, an ending time domain position, a starting position of an i-th symbol, and an ending position of a j-th symbol, wherein, i and j are a same or different positive integers.

Optionally, the method further includes: determining, by the terminal, a time domain position of a first beam of the first signal; wherein, the time domain position of the first beam of the first signal has a functional relationship with a time domain position offset of the first beam of the first signal and the time domain position of the first signal; or the time domain position of the first beam of the first signal has a functional relationship with the time domain information of the target reference signal; or the time domain position of the first beam of the first signal has a functional relationship with the time domain position offset of the first beam of the first signal and the time domain information of the target reference signal.

Optionally, the functional relationship between the time domain position of the first beam of the first signal and the time domain position offset of the first beam of the first signal and the time domain position of the first signal include at least one of the following: a twenty-first functional relationship between the time domain position of the first beam of the first signal and the time domain position offset of the first beam and a time domain position of a radio frame where the first signal is located; a twenty-second functional relationship between the time domain position of the first beam of the first signal and the time domain position offset of the first beam and a time domain position of a subframe where the first signal is located; a twenty-third functional relationship between the time domain position of the first beam of the first signal and the time domain position offset of the first beam and a time domain position of a slot where the first signal is located; a twenty-fourth functional relationship between the time domain position of the first beam of the first signal and the time domain position offset of the first beam and a time domain position of a symbol where the first signal is located; a twenty-fifth functional relationship between the time domain position of the first beam of the first signal and the time domain position offset of the first beam and a time domain position of MO of the first signal.

Optionally, the functional relationship between the time domain position of the first beam of the first signal and the time domain information of the target reference signal includes at least one of the following: a twenty-sixth functional relationship between the time domain position of the first beam of the first signal and a time domain position of a radio frame where the target reference signal is located; a twenty-seventh functional relationship between the time domain position of the first beam of the first signal and a time domain position of a subframe where the target reference signal is located; a twenty-eighth functional relationship between the time domain position of the first beam of the first signal and a time domain position of a slot where the target reference signal is located; a twenty-ninth functional relationship between the time domain position of the first beam of the first signal and a time domain position of a symbol where the target reference signal is located; thirtieth functional relationship between the time domain position of the first beam of the first signal and a time domain position of MO of the target reference signal; a thirty-first functional relationship between the time domain position of the first beam of the first signal and a parameter of the time domain position of the radio frame where the target reference signal is located; a thirty-second functional relationship between the time domain position of the first beam of the first signal and a parameter of the time domain position of the subframe where the target reference signal is located; a thirty-third functional relationship between the time domain position of the first beam of the first signal and a parameter of the time domain position of the slot where the target reference signal is located; a thirty-fourth functional relationship between the time domain position of the first beam of the first signal and a parameter of the time domain position of the symbol where the target reference signal is located; a thirty-fifth functional relationship between the time domain position of the first beam of the first signal and a parameter of the time domain position of the MO of the target reference signal.

Optionally, the functional relationship between the time domain position of the first beam of the first signal and the time domain position offset of the first beam of the first signal and the time domain information of the target reference signal includes at least one of the following: a thirty-sixth functional relationship between the time domain position of the first beam of the first signal and the time domain position offset of the first beam and a time domain position of a radio frame where the target reference signal is located; a thirty-seventh functional relationship between the time domain position of the first beam of the first signal and the time domain position offset of the first beam and a time domain position of a subframe where the target reference signal is located; a thirty-eighth functional relationship between the time domain position of the first beam of the first signal and the time domain position offset of the first beam and a time domain position of a slot where the target reference signal is located; a thirty-ninth functional relationship between the time domain position of the first beam of the first signal and the time domain position offset of the first beam and a time domain position of a symbol where the target reference signal is located; a fortieth functional relationship between the time domain position of the first beam of the first signal and the time domain position offset of the first beam and a time domain position of MO of the target reference signal; a forty-first functional relationship between the time domain position of the first beam of the first signal and the time domain position offset of the first beam and a parameter of the time domain position of the radio frame where the target reference signal is located; a forty-second functional relationship between the time domain position of the first beam of the first signal and the time domain position offset of the first beam and a parameter of the time domain position of the subframe where the target reference signal is located; a forty-third functional relationship between the time domain position of the first beam of the first signal and the time domain position offset of the first beam and a parameter of the time domain position of the slot where the target reference signal is located; a forty-fourth functional relationship between the time domain position of the first beam of the first signal and the time domain position offset of the first beam and a parameter of the time domain position of the symbol where the target reference signal is located; a forty-fifth functional relationship between the time domain position of the first beam of the first signal and the time domain position offset of the first beam and a parameter of the time domain position of the MO of the target reference signal.

Optionally, the time domain information of the target reference signal includes at least one of the following: a time domain position of a radio frame where the target reference signal is located; a time domain position of a subframe where the target reference signal is located; a time domain position of a slot where the target reference signal is located; a time domain position of a symbol where the target reference signal is located; a time domain position of MO of the target reference signal; a parameter of the time domain position of the radio frame where the target reference signal is located; a parameter of the time domain position of the subframe where the target reference signal is located; a parameter of the time domain position of the slot where the target reference signal is located; a parameter of the time domain position of the symbol where the target reference signal is located; a parameter of the time domain position of the MO of the target reference signal.

Optionally, the time domain position of the first signal includes at least one of the following: a time domain position of a radio frame where the first signal is located; a time domain position of a subframe where the first signal is located; a time domain position of a slot where the first signal is located; a time domain position of a symbol where the first signal is located; a time domain position of MO of the first signal.

An embodiment of the present disclosure provides a signal sending method, including: determining, by a network device, a time domain position of a first signal according to time domain information of a target reference signal; sending, by the network device, the first signal according to the time domain position of the first signal.

Optionally, the first signal includes one of the following: a tracking reference signal (TRS), a channel state information reference signal (CSI-RS), and paging early indication (PEI).

Optionally, the target reference signal includes at least one of the following: a paging message, a synchronization signal block (SSB), a TRS, a CSI-RS or PEI; wherein a content included in the first signal is different from a content included in the target reference signal.

Optionally, the time domain position of the first signal has a functional relationship with the time domain information of the target reference signal.

Optionally, the functional relationship between the time domain position of the first signal and the time domain information of the target reference signal includes at least one of the following: a first functional relationship between the time domain position of the first signal and a time domain position of a radio frame where the target reference signal is located; a second functional relationship between the time domain position of the first signal and a time domain position of a subframe where the target reference signal is located; a third functional relationship between the time domain position of the first signal and a time domain position of a slot where the target reference signal is located; a fourth functional relationship between the time domain position of the first signal and a time domain position of a symbol where the target reference signal is located; a fifth functional relationship between the time domain position of the first signal and a time domain position of MO of the target reference signal; a sixth functional relationship between the time domain position of the first signal and a parameter of the time domain position of the radio frame where the target reference signal is located; a seventh functional relationship between the time domain position of the first signal and a parameter of the time domain position of the subframe where the target reference signal is located; an eighth functional relationship between the time domain position of the first signal and a parameter of the time domain position of the slot where the target reference signal is located; a ninth functional relationship between the time domain position of the first signal and a parameter of the time domain position of the symbol where the target reference signal is located; a tenth functional relationship between the time domain position of the first signal and a parameter of the time domain position of the MO of the target reference signal.

Optionally, the determining, by the terminal, a time domain position of a first signal according to time domain information of a target reference signal, includes: determining, by the terminal, the time domain position of the first signal according to time domain information of the target reference signal and a time domain position offset of the first signal.

Optionally, the time domain position of the first signal has a functional relationship with the time domain position offset of the first signal and the time domain information of the target reference signal.

Optionally, the functional relationship between the time domain position of the first signal and the time domain position offset of the first signal and the time domain information of the target reference signal includes at least one of the following; an eleventh functional relationship between the time domain position of the first signal and the time domain position offset of the first signal and a time domain position of a radio frame where the target reference signal is located; a twelfth functional relationship between the time domain position of the first signal and the time domain position offset of the first signal and a time domain position of a subframe where the target reference signal is located; a thirteenth functional relationship between the time domain position of the first signal and the time domain position offset of the first signal and a time domain position of a slot where the target reference signal is located; a fourteenth functional relationship between the time domain position of the first signal and the time domain position offset of the first signal and a time domain position of a symbol where the target reference signal is located; a fifteenth functional relationship between the time domain position of the first signal and the time domain position offset of the first signal and a time domain position of MO of the target reference signal; a sixteenth functional relationship between the time domain position of the first signal and the time domain position offset of the first signal and a parameter of time domain position of the radio frame where the target reference signal is located; a seventeenth functional relationship between the time domain position of the first signal and the time domain position offset of the first signal and a parameter of the time domain position of the subframe where the target reference signal is located; an eighteenth functional relationship between the time domain position of the first signal and the time domain position offset of the first signal and a parameter of the time domain position of the slot where the target reference signal is located; a nineteenth functional relationship between the time domain position of the first signal and the time domain position offset of the first signal and a parameter of the time domain position of the symbol where the target reference signal is located; a twentieth functional relationship between the time domain position of the first signal and the time domain position offset of the first signal and a parameter of the time domain position of the MO of the target reference signal is located.

Optionally, the time domain position includes one of the following: a starting time domain position, an ending time domain position, a starting position of an i-th symbol, and an ending position of a j-th symbol, wherein, i and j are a same or different positive integers.

Optionally, the method further includes: determining, by the network device, a time domain position of a first beam of the first signal; wherein, the time domain position of the first beam of the first signal has a functional relationship with a time domain position offset of the first beam of the first signal and the time domain position of the first signal; or the time domain position of the first beam of the first signal has a functional relationship with the time domain information of the target reference signal; or the time domain position of the first beam of the first signal has a functional relationship with the time domain position offset of the first beam of the first signal and the time domain information of the target reference signal.

Optionally, the functional relationship between the time domain position of the first beam of the first signal and the time domain position offset of the first beam of the first signal and the time domain position of the first signal include at least one of the following: a twenty-first functional relationship between the time domain position of the first beam of the first signal and the time domain position offset of the first beam and a time domain position of a radio frame where the first signal is located; a twenty-second functional relationship between the time domain position of the first beam of the first signal and the time domain position offset of the first beam and a time domain position of a subframe where the first signal is located; a twenty-third functional relationship between the time domain position of the first beam of the first signal and the time domain position offset of the first beam and a time domain position of a slot where the first signal is located; a twenty-fourth functional relationship between the time domain position of the first beam of the first signal and the time domain position offset of the first beam and a time domain position of a symbol where the first signal is located; a twenty-fifth functional relationship between the time domain position of the first beam of the first signal and the time domain position offset of the first beam and a time domain position of MO of the first signal.

Optionally, the functional relationship between the time domain position of the first beam of the first signal and the time domain information of the target reference signal includes at least one of the following: a twenty-sixth functional relationship between the time domain position of the first beam of the first signal and a time domain position of a radio frame where the target reference signal is located; a twenty-seventh functional relationship between the time domain position of the first beam of the first signal and a time domain position of a subframe where the target reference signal is located; a twenty-eighth functional relationship between the time domain position of the first beam of the first signal and a time domain position of a slot where the target reference signal is located; a twenty-ninth functional relationship between the time domain position of the first beam of the first signal and a time domain position of a symbol where the target reference signal is located; a thirtieth functional relationship between the time domain position of the first beam of the first signal and a time domain position of MO of the target reference signal; a thirty-first functional relationship between the time domain position of the first beam of the first signal and a parameter of the time domain position of the radio frame where the target reference signal is located; a thirty-second functional relationship between the time domain position of the first beam of the first signal and a parameter of the time domain position of the subframe where the target reference signal is located; a thirty-third functional relationship between the time domain position of the first beam of the first signal and a parameter of the time domain position of the slot where the target reference signal is located; a thirty-fourth functional relationship between the time domain position of the first beam of the first signal and a parameter of the time domain position of the symbol where the target reference signal is located; a thirty-fifth functional relationship between the time domain position of the first beam of the first signal and a parameter of the time domain position of the MO of the target reference signal.

Optionally, the functional relationship between the time domain position of the first beam of the first signal and the time domain position offset of the first beam of the first signal and the time domain information of the target reference signal includes at least one of the following: a thirty-sixth functional relationship between the time domain position of the first beam of the first signal and the time domain position offset of the first beam and a time domain position of a radio frame where the target reference signal is located; a thirty-seventh functional relationship between the time domain position of the first beam of the first signal and the time domain position offset of the first beam and a time domain position of a subframe where the target reference signal is located; a thirty-eighth functional relationship between the time domain position of the first beam of the first signal and the time domain position offset of the first beam and a time domain position of a slot where the target reference signal is located; a thirty-ninth functional relationship between the time domain position of the first beam of the first signal and the time domain position offset of the first beam and a time domain position of a symbol where the target reference signal is located; a fortieth functional relationship between the time domain position of the first beam of the first signal and the time domain position offset of the first beam and a time domain position of MO of the target reference signal; a forty-first functional relationship between the time domain position of the first beam of the first signal and the time domain position offset of the first beam and a parameter of the time domain position of the radio frame where the target reference signal is located; a forty-second functional relationship between the time domain position of the first beam of the first signal and the time domain position offset of the first beam and a parameter of the time domain position of the subframe where the target reference signal is located; a forty-third functional relationship between the time domain position of the first beam of the first signal and the time domain position offset of the first beam and a parameter of the time domain position of the slot where the target reference signal is located; a forty-fourth functional relationship between the time domain position of the first beam of the first signal and the time domain position offset of the first beam and a parameter of the time domain position of the symbol where the target reference signal is located; a forty-fifth functional relationship between the time domain position of the first beam of the first signal and the time domain position offset of the first beam and a parameter of the time domain position of the MO of the target reference signal.

Optionally, the time domain information of the target reference signal includes at least one of the following: a time domain position of a radio frame where the target reference signal is located; a time domain position of a subframe where the target reference signal is located; a time domain position of a slot where the target reference signal is located; a time domain position of a symbol where the target reference signal is located; a time domain position of MO of the target reference signal; a parameter of the time domain position of the radio frame where the target reference signal is located; a parameter of the time domain position of the subframe where the target reference signal is located; a parameter of the time domain position of the slot where the target reference signal is located; a parameter of the time domain position of the symbol where the target reference signal is located; a parameter of the time domain position of the MO of the target reference signal.

Optionally, the time domain position of the first signal includes at least one of the following: a time domain position of a radio frame where the first signal is located; a time domain position of a subframe where the first signal is located; a time domain position of a slot where the first signal is located; a time domain position of a symbol where the first signal is located; a time domain position of MO of the first signal.

An embodiment of the present disclosure provides a terminal including: a memory, a transceiver, and a processor, wherein: the memory is used to store a computer program; the transceiver is used to send and receive data under the control of the processor; the processor is used to read the computer program in the memory and perform the following operations: determining a time domain position of a first signal according to time domain information of a target reference signal; receiving the first signal according to the time domain position of the first signal.

Optionally, the first signal includes one of the following: a tracking reference signal (TRS), a channel state information reference signal (CSI-RS), and paging early indication (PEI).

Optionally, the target reference signal includes at least one of the following: a paging message, a synchronization signal block (SSB), a TRS, a CSI-RS or PEI; wherein a content included in the first signal is different from a content included in the target reference signal.

Optionally, the time domain position of the first signal has a functional relationship with the time domain information of the target reference signal.

Optionally, the determining a time domain position of a first signal according to time domain information of a target reference signal, includes: determining the time domain position of the first signal according to time domain information of the target reference signal and a time domain position offset of the first signal.

Optionally, the processor is configured to read the computer program in the memory and further perform the following operations: determining a time domain position of a first beam of the first signal; wherein, the time domain position of the first beam of the first signal has a functional relationship with a time domain position offset of the first beam of the first signal and the time domain position of the first signal; or the time domain position of the first beam of the first signal has a functional relationship with the time domain information of the target reference signal; or the time domain position of the first beam of the first signal has a functional relationship with the time domain position offset of the first beam of the first signal and the time domain information of the target reference signal.

An embodiment of the present disclosure provides a network device comprising: a memory, a transceiver, and a processor, wherein: the memory is used to store a computer program; the transceiver is used to send and receive data under the control of the processor; the processor is used to read the computer program in the memory and perform the following operations: determining a time domain position of a first signal according to time domain information of a target reference signal; sending the first signal according to the time domain position of the first signal.

Optionally, the first signal includes one of the following: a tracking reference signal (TRS), a channel state information reference signal (CSI-RS), and paging early indication (PEI).

Optionally, the target reference signal includes at least one of the following: a paging message, a synchronization signal block (SSB), a TRS, a CSI-RS or PEI; wherein a content included in the first signal is different from a content included in the target reference signal.

Optionally, the time domain position of the first signal has a functional relationship with the time domain information of the target reference signal.

Optionally, the determining a time domain position of a first signal according to time domain information of a target reference signal, includes: determining the time domain position of the first signal according to time domain information of the target reference signal and a time domain position offset of the first signal.

Optionally, the processor is configured to read the computer program in the memory and further perform the following operations: determining a time domain position of a first beam of the first signal; wherein, the time domain position of the first beam of the first signal has a functional relationship with a time domain position offset of the first beam of the first signal and the time domain position of the first signal; or the time domain position of the first beam of the first signal has a functional relationship with the time domain information of the target reference signal; or the time domain position of the first beam of the first signal has a functional relationship with the time domain position offset of the first beam of the first signal and the time domain information of the target reference signal.

An embodiment of the present disclosure provides a terminal including: a first determination unit, configured to determine a time domain position of a first signal according to time domain information of a target reference signal; a receiving unit, configured to receive the first signal according to the time domain position of the first signal.

An embodiment of the present disclosure provides a network device including: a first determining unit, configured to determine a time domain position of a first signal according to time domain information of a target reference signal; a sending unit, configured to send the first signal according to the time domain position of the first signal.

An embodiment of the present disclosure provides a processor-readable storage medium, wherein the processor-readable storage medium stores a computer program, and the computer program is executed by a processor to perform the signal receiving method, or the signal sending method.

In the embodiment of the present disclosure, the terminal determines the time domain position of the first signal according to the time domain information of the target reference signal, receives the first signal according to the time domain position of the first signal, so that RRC signaling is not required to configure the time domain position of the first signal, thereby saving power consumption of the terminal.

DETAILED DESCRIPTION

In order to make the technical problems, technical solutions and advantages to be solved by the present disclosure clearer, the following will describe in detail with reference to the drawings and specific embodiments.

The term "and/or" in the embodiments of the present disclosure describes the association relationship of associated objects, indicating that there may be three relationships, for example, A and/or B, which may mean: A exists alone, A and B exist simultaneously, and B exists alone. The character "/" generally indicates that the contextual objects are an "or" relationship.

The term "plurality" in the embodiments of the present disclosure refers to two or more, and other quantifiers are similar.

The following will clearly and completely describe the technical solutions in the embodiments of the present disclosure with reference to the accompanying drawings. Obviously, the described embodiments are only some of the embodiments of the present application, not all of them. Based on the embodiments in the present disclosure, all other embodiments obtained by persons of ordinary skill in the art without making creative efforts belong to the scope of protection of the present disclosure.

Embodiments of the present disclosure provide a signal receiving method, a sending method, a terminal, a network device, and a storage medium, so as to solve the problem of high power consumption of the terminal.

The method and the device are conceived based on the same application concept. Since the method and the device have similar problem-solving principles, the embodiments of the device and the method can be referred to each other, and the same parts will not be repeated.

The technical solutions provided by the embodiments of the present disclosure may be applicable to various systems, especially 6G systems. For example, the applicable system may be global system of mobile communication (GSM) system, code division multiple access (CDMA) system, wideband code division multiple access (WCDMA) general packet radio service (GPRS) system, long term evolution (LTE) system, LTE frequency division duplex (FDD) system, LTE time division duplex (TDD) system, Long term evolution advanced (LTE-A) system, universal mobile telecommunications system (UMTS), worldwide interoperability for microwave access (WiMAX) system, 5G new radio (NR) system, 6G system, etc. These various systems include terminal devices and network devices. The system may also include a core network part, such as an evolved packet system (EPS), a 5G system (5GS), and the like.

Figure 1:
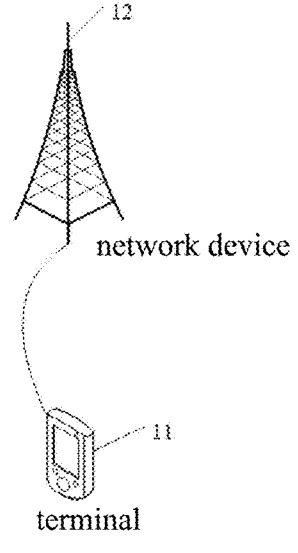
FIG. 1 is a schematic structural diagram of a network architecture according to an embodiment of the present disclosure.

FIG. 1 is a schematic structural diagram of a network architecture according to an embodiment of the present disclosure. As shown in FIG. 1, it includes a terminal 11 and a network device 12.

Wherein, the terminal involved in the embodiments of the present disclosure may be a device that provides voice and/or data connectivity to users, a handheld device with a wireless connection function, or other processing devices connected to a wireless modem. In different systems, the name of the terminal may be different. For example, in a 5G system, the terminal may be called user equipment (UE). Wireless terminal can communicate with one or more core networks (CN) via a radio access network (RAN). The wireless terminal can be a mobile terminal equipment, such as a mobile phone (or called a "cellular" telephones) and computers with mobile terminal equipment, such as portable, pocket, hand-held, computer built-in or vehicle-mounted mobile devices, which exchange voice and/or data with the radio access network. For example, Personal Communication Service (PCS) phones, cordless phones, Session Initiated Protocol (SIP) phones, Wireless Local Loop (WLL) stations, Personal Digital Assistant (PDA), Redcap terminal and other devices. Wireless terminal equipment can also be called system, subscriber unit, subscriber station, mobile station, remote station, access point, a remote terminal, an access terminal, a user terminal, a user agent, and a user device, which are not limited in the embodiments of the present disclosure.

The network device involved in the embodiments of the present disclosure may be a base station, and the base station may include multiple cells that provide services for terminals. Depending on the specific application, the base station can also be called an access point, or it can be a device in the access network that communicates with the wireless terminal device through one or more sectors on the air interface, or other names. Network devices can be used to interchange received over-the-air frames with Internet Protocol (IP) packets and act as routers between wireless terminal devices and the rest of the access network, which can include the Internet Protocol (IP) communication network. Network devices may also coordinate attribute management for the air interface. For example, the network device involved in this embodiment of the present disclosure may be a network device (Base Transceiver Station, BTS) in Global System for Mobile communications (GSM) or Code Division Multiple Access (CDMA), or a network device (NodeB) in Wide-band Code Division Multiple Access (WCDMA), or an evolved network device in a long term evolution (LTE) system (evolutional Node B, eNB or e-NodeB), 5G base station (gNB) in the 5G network architecture, base station in 6G, or a Home evolved Node B (HeNB), a relay node, a home base station (femto), a pico base station (pico), etc. are not limited in this embodiment of the present disclosure. In some network structures, a network device may include a centralized unit (CU) node and a distributed unit (DU) node, and the centralized unit and the distributed unit may also be arranged geographically separately.

One or more antennas can be used between network devices and terminals for Multi Input Multi Output (MIMO) transmission. MIMO transmission can be Single User MIMO (SU-MIMO) or Multi-User MIMO (MU-MIMO). According to the shape and number of root antenna combinations, MIMO transmission can be 2D-MIMO 3D-MIMO or massive-MIMO, or diversity transmission, precoding transmission, or beamforming transmission, etc.

Figure 2:
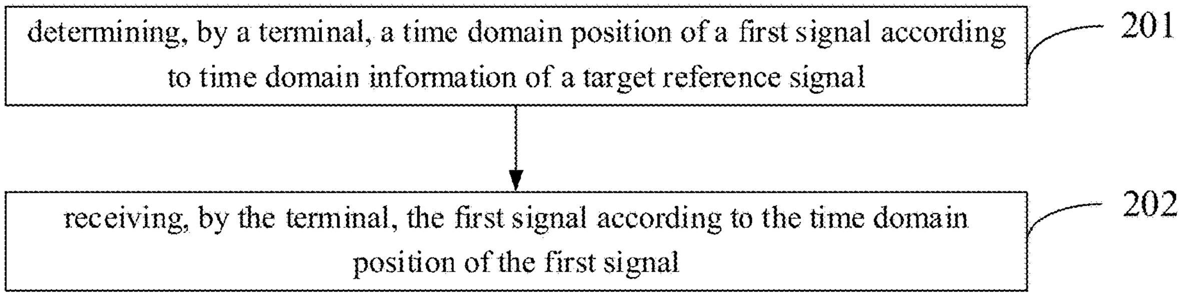
FIG. 2 is a flow chart of a signal receiving method according to an embodiment of the present disclosure.

FIG. 2 is a flow chart of a signal receiving method provided by an embodiment of the present disclosure. As shown in FIG. 2, it includes the following steps:

Step 201, determining, by a terminal, a time domain position of a first signal according to time domain information of a target reference signal;

Step 202, receiving, by the terminal, the first signal according to the time domain position of the first signal.

The time domain information of the target reference signal may be received by the terminal from the network device, for example: the network device configures the time domain information of the target reference signal through system information, such as through a system information block (SIB) or a master information block or a master information block (MIB) according to the protocol). Of course, the embodiment of the present disclosure does not limit this, for example, the time domain information of the target reference signal may also be preconfigured or agreed in a protocol.

Optionally, the first signal includes one of the following items:

A TRS, a CSI-RS, PEI.

The PEI may be at least used to indicate whether to monitor a paging message.

Optionally, the target reference signal includes at least one of the following:

A paging message, an SSB, a TRS, a CSI-RS, PEI;

Wherein, a content included in the first signal is different from a content included in the target reference signal.

The content included in the first signal is different from the content included in the target reference signal, that are, when the first signal is TRS, the target reference signal is at least one of paging message, SSB, CSI-RS, and PEI, or, when the first signal is CSI-RS, the target reference signal is at least one of paging message, SSB, TRS, and PEI, or, when the first signal is PEI, the target reference signal is at least one of paging message, SSB, TRS, and CSI-RS.

The determining the time domain position of the first signal according to the time domain information of the target reference signal may be determining the time domain information of the target reference signal and determining a time domain position of the first signal according to a corresponding relationship between the time domain information of the target reference signal and a time domain position of the first signal.

In the embodiment of the present disclosure, through the above steps, the time domain position of the first signal can be determined according to the time domain information of the target reference signal, so that RRC signaling is not required to configure the time domain position of the first signal, thereby saving power consumption of the terminal.

In an embodiment of the present disclosure, the time domain information of the target reference signal may include at least one of a parameter of a time domain position of the target reference signal and a time domain position of the target reference signal.

Optionally, the time domain information of the target reference signal includes at least one of the following:

a time domain position of a radio frame where the target reference signal is located;

a time domain position of a subframe where the target reference signal is located;

a time domain position of a slot where the target reference signal is located;

a time domain position of a symbol where the target reference signal is located;

a time domain position of an MO of the target reference signal;

A parameter of the time domain position of the radio frame where the target reference signal is located;

A parameter of the time domain position of the subframe where the target reference signal is located;

A parameter of the time domain position of the slot where the target reference signal is located;

A parameter of the time domain position of the symbol where the target reference signal is located;

A parameter of the time domain position of the MO of the target reference signal.

The parameters of the time domain position of the radio frame where the target reference signal is located may include at least one of the following:

SFN, PF, PF_offset, a detection parameter of target reference signal;

wherein PF represents the radio frame of the paging message, PF_offset represents the offset of the time domain position of the target radio frame of the paging message, the detection parameter of the target reference signal can indicate a detection period of the target reference signal, such as a paging period T, or the detection parameter of the target reference signal can also indicate a number of radio frames used to detect the target reference signal in the detection period of the target reference signal, for example: the number of paging frames (PF) in the paging period.

Taking the target reference signal as a paging message as an example, the parameter of the time domain position of the radio frame where the target reference signal is located may include at least one of the following:

T, N, SFN, PF, PF_offset.

Wherein, T represents a paging period, and N is the number of PFs in one paging period.

The parameter of the time domain position of the subframe where the target reference signal is located may include at least one of the following:

a number of detection opportunities of the target reference signal in the PF, and a number of subframes used to detect the target reference signal in the detection period of the target reference signal.

For example: the parameter of the time domain position of the subframe where the paging message is located may include at least one of the following N, Ns;

Wherein, Ns is a number of paging occasion (PO) associated under one PF.

The parameter of the time domain position of the slot where the target reference signal is located may include at least one of the following:

a number of detection opportunities of the target reference signal in the PF, and a number of slots used for detecting the target reference signal in the detection period of the target reference signal.

For example: the parameter of the time domain position of the slot where the paging message is located may include at least one of the following N, Ns.

The parameter of the time domain position of the symbol where the target reference signal is located may include: parameters such as a position index and a position serial number of the symbol where the target reference signal is located.

The parameter of the time domain position of the MO of the target reference signal may include: position parameters of the symbol where the MO is located, such as position index and position serial number of the symbol.

In the embodiment of the present disclosure, the time domain position may include the following items:

a starting time domain position, an ending time domain position, a starting position of an i-th symbol, and an ending position of an j-th symbol, wherein, i and j are the same or different positive integers.

For example: the time domain position of the first signal includes at least one of the following:

A starting time domain position of the first signal, an end time domain position of the first signal, the starting position of the i-th symbol of the first signal, and the end position of the j-th symbol of the first signal.

For example: the time domain position of the target reference signal includes at least one of the following:

a starting time domain position of the target reference signal, an end time domain position of the target reference signal, a starting position of the i-th symbol of the target reference signal, and an end position of the j-th symbol of the target reference signal.

For example: the time domain position of the radio frame where the target reference signal is located includes at least one of the following:

A starting time domain position of the radio frame where the target reference signal is located, an end time domain position of the radio frame where the target reference signal is located, a starting position of the i-th symbol of the radio frame where the target reference signal is located, and an end position of the j-th symbol of the radio frame where the target reference signal is located.

The time domain position of the subframe where the target reference signal is located may include at least one of the following:

A starting time domain position of the subframe where the target reference signal is located, an end time domain position of the subframe where the target reference signal is located, a starting position of the i-th symbol of the subframe where the target reference signal is located, and an end position of the j-th symbol of the subframe of the target reference signal.

The time domain position of the slot where the target reference signal is located may include at least one of the following:

A starting time domain position of the slot where the target reference signal is located, an end time domain position of the slot where the target reference signal is located, a starting position of the i-th symbol of the slot where the target reference signal is located, and an end time domain position of the j-th symbol of the slot where the target reference signal is located.

As an optional implementation, the time domain position of the first signal has a functional relationship with the time domain information of the target reference signal.

Wherein, the functional relationship between the time domain position of the first signal and the time domain information of the target reference signal may be agreed in the protocol and preconfigured by the network side.

In this implementation, the time domain position of the first signal can be accurately determined by the functional relationship between the time domain position of the first signal and the time domain information of the target reference signal.

Optionally, the functional relationship between the time domain position of the first signal and the time domain information of the target reference signal includes at least one of the following:

A first functional relationship between the time domain position of the first signal and the time domain position of the radio frame where the target reference signal is located;

A second functional relationship between the time domain position of the first signal and the time domain position of the subframe where the target reference signal is located;

A third functional relationship between the time domain position of the first signal and the time domain position of the slot where the target reference signal is located;

A fourth functional relationship between the time domain position of the first signal and the time domain position of the symbol where the target reference signal is located;

A fifth functional relationship between the time domain position of the first signal and the time domain position of the MO of the target reference signal;

A sixth functional relationship between the time domain position of the first signal and the parameter of the time domain position of the radio frame where the target reference signal is located;

A seventh functional relationship between the time domain position of the first signal and the parameter of the time domain position of the subframe where the target reference signal is located;

An eighth functional relationship between the time domain position of the first signal and the parameter of the time domain position of the slot where the target reference signal is located;

A ninth functional relationship between the time domain position of the first signal and the parameter of the time domain position of the symbol where the target reference signal is located;

A tenth functional relationship between the time domain position of the first signal and the parameter of the time domain position of the MO of the target reference signal.

In the embodiment of the present disclosure, the time domain position of the first signal includes at least one of the following:

the time domain position of the radio frame where the first signal is located;

the time domain position of the subframe where the first signal is located;

the time domain position of the slot where the first signal is located;

the time domain position of the symbol where the first signal is located;

the time domain position of the MO of the first signal.

The first functional relationship between the time domain position of the first signal and the time domain position of the radio frame where the target reference signal is located may include at least one of the following:

A functional relationship between the time domain position of the radio frame where the first signal is located and the time domain position of the radio frame where the target reference signal is located;

A functional relationship between the time domain position of the subframe where the first signal is located and the time domain position of the radio frame where the target reference signal is located;

A functional relationship between the time domain position of the slot where the first signal is located and the time domain position of the radio frame where the target reference signal is located;

A functional relationship between the time domain position of the symbol where the first signal is located and the time domain position of the radio frame where the target reference signal is located;

A functional relationship between the time domain position of the MO of the first signal and the time domain position of the radio frame where the target reference signal is located.

For example, the functional relationship between the time domain position of the radio frame where the first signal is located and the time domain position of the radio frame where the target reference signal is located may be first signal_SFN=target reference signal_SFN.

The functional relationship between the time domain position of the subframe where the first signal is located and the time domain position of the radio frame where the target reference signal is located may be: first signal_subframe=target reference signal_SFN*the number of subframes in each radio frame.

The functional relationship between the time domain position of the slot where the first signal is located and the time domain position of the radio frame where the target reference signal is located may be: first signal_slot=target reference signal_SFN*the number of subframes in each radio frame*the number of slots in each subframe.

The functional relationship between the time domain position of the symbol where the first signal is located and the time domain position of the radio frame where the target reference signal is located can be: first signal_symbol=target reference signal_symbol, or, the first signal_symbols=the number of symbols per 0 target reference signal_symbols.

The functional relationship between the time domain position of the MO of the first signal and the time domain position of the radio frame where the target reference signal is located, may be the first signal_MO=target reference signal_MO_symbol, or the first signal_MO=number of symbols per slot+target reference signal_MO_symbol.

It should be noted that the functional relationship listed above is only an example. The functional relationship in the embodiments of the present disclosure may be defined by the protocol or configured on the network side. The specific content of each functional relationship is not limited in the embodiments of the present disclosure. The specific tasks of each function relationship can be configured according to business scenarios, terminal requirements, etc. For example: the above second function may also include the argument of the radio frame where the target reference signal is located, and the third function may also include the arguments of the radio frame where the target reference signal is located and the subframe where the target reference signal is located, the fourth function may also include the arguments of the radio frame where the target reference signal is located, the subframe where the target reference signal is located, and the slot where the target reference signal is located. The fifth function may also include the arguments of the radio frame where the target reference signal is located, the subframe where the target reference signal is located, the slot where the target reference signal is located, and the symbol where the target reference signal is located.

The second functional relationship between the time domain position of the first signal and the time domain position of the subframe where the target reference signal is located may include at least one of the following:

A functional relationship between the time domain position of the subframe where the first signal is located and the time domain position of the subframe where the target reference signal is located;

A functional relationship between the time domain position of the slot where the first signal is located and the time domain position of the subframe where the target reference signal is located;

A functional relationship between the time domain position of the symbol where the first signal is located and the time domain position of the subframe where the target reference signal is located;

A functional relationship between the time domain position of the MO of the first signal and the time domain position of the subframe where the target reference signal is located.

The third functional relationship between the time domain position of the first signal and the time domain position of the slot where the target reference signal is located may include at least one of the following:

A functional relationship between the time domain position of the slot where the first signal is located and the time domain position of the slot where the target reference signal is located;

A functional relationship between the time domain position of the symbol where the first signal is located and the time domain position of the slot where the target reference signal is located;

A functional relationship between the time domain position of the MO of the first signal and the time domain position of the slot where the target reference signal is located.

The fourth functional relationship between the time domain position of the first signal and the time domain position of the symbol where the target reference signal is located may include at least one of the following:

A functional relationship between the time domain position of the symbol where the first signal is located and the time domain position of the symbol where the target reference signal is located;

A functional relationship between the time domain position of the MO of the first signal and the time domain position of the symbol where the target reference signal is located.

The fifth functional relationship between the time domain position of the first signal and the time domain position of the MO of the target reference signal may include:

A functional relationship between the time domain position of the MO of the first signal and the time domain position of the MO of the target reference signal.

The sixth functional relationship between the time domain position of the first signal and the parameter of the time domain position of the radio frame where the target reference signal is located may include at least one of the following:

A functional relationship between the time domain position of the radio frame where the first signal is located and the parameter of the time domain position of the radio frame where the target reference signal is located;

A functional relationship between the time domain position of the subframe where the first signal is located and the parameter of the time domain position of the radio frame where the target reference signal is located;

A functional relationship between the time domain position of the slot where the first signal is located and the parameter of the time domain position of the radio frame where the target reference signal is located;

A functional relationship between the time domain position of the symbol where the first signal is located and the parameter of the time domain position of the radio frame where the target reference signal is located;

A functional relationship between the time domain position of the MO of the first signal and the parameter of the time domain position of the radio frame where the target reference signal is located.

The seventh functional relationship between the time domain position of the first signal and the parameter of the time domain position of the subframe where the target reference signal is located may include at least one of the following:

A functional relationship between the time domain position of the subframe where the first signal is located and the parameter of the time domain position of the subframe where the target reference signal is located;

A functional relationship between the time domain position of the slot where the first signal is located and the parameter of the time domain position of the subframe where the target reference signal is located;

A functional relationship between the time domain position of the symbol where the first signal is located and the parameter of the time domain position of the subframe where the target reference signal is located;

A functional relationship between the time domain position of the MO of the first signal and the parameter of the time domain position of the subframe where the target reference signal is located.

The eighth functional relationship between the time domain position of the first signal and the parameter of the time domain position of the slot where the target reference signal is located may include at least one of the following:

A functional relationship between the time domain position of the slot where the first signal is located and the parameter of the time domain position of the slot where the target reference signal is located;

A functional relationship between the time domain position of the symbol where the first signal is located and the parameter of the time domain position of the slot where the target reference signal is located;

A functional relationship between the time domain position of the MO of the first signal and the parameter of the time domain position of the slot where the target reference signal is located.

The ninth functional relationship between the time domain position of the first signal and the parameter of the time domain position of the symbol where the target reference signal is located may include at least one of the following:

A functional relationship between the time domain position of the symbol where the first signal is located and the parameter of the time domain position of the symbol where the target reference signal is located;

A functional relationship between the time domain position of the MO of the first signal and the parameter of the time domain position of the symbol where the target reference signal is located.

The tenth functional relationship between the time domain position of the first signal and the parameter of the time domain position of the MO of the target reference signal may include:

A functional relationship between the time domain position of the MO of the first signal and the parameter of the time domain position of the MO of the target reference signal.

As an optional implementation, the determining, by the terminal, the time domain position of the first signal according to the time domain information of the target reference signal, includes:

Determining, by the terminal, the time domain position of the first signal according to the time domain information of the target reference signal and a time domain position offset of the first signal.

Wherein, the time domain position offset of the first signal may include at least one of the following:

a radio frame offset of the first signal;

a subframe offset of the first signal;

a slot offset of the first signal;

a symbol offset of the first signal;

MO offset of the first signal.

In addition, the time domain position offset of the first signal may be agreed in a protocol or configured by the network side.

Optionally, the time domain position of the first signal has a functional relationship with the time domain position offset of the first signal and the time domain information of the target reference signal.

Wherein, the time domain position of the first signal has a functional relationship with the time domain position offset of the first signal and the time domain information of the target reference signal may be agreed in a protocol or configured on the network side.

Optionally, the functional relationship between the time domain position of the first signal and the time domain position offset of the first signal and the time domain information of the target reference signal includes at least one of the following;

An eleventh functional relationship between the time domain position of the first signal and the time domain position offset of the first signal and the time domain position of the radio frame where the target reference signal is located;

A twelfth functional relationship between the time domain position of the first signal and the time domain position offset of the first signal and the time domain position of the subframe where the target reference signal is located;

A thirteenth functional relationship between the time domain position of the first signal and the time domain position offset of the first signal and the time domain position of the slot where the target reference signal is located;

A fourteenth functional relationship between the time domain position of the first signal and the time domain position offset of the first signal and the time domain position of the symbol where the target reference signal is located;

A fifteenth functional relationship between the time domain position of the first signal and the time domain position offset of the first signal and the time domain position of the MO of the target reference signal;

A sixteenth functional relationship between the time domain position of the first signal and the time domain position offset of the first signal and the parameter of time domain position of the radio frame where the target reference signal is located;

A seventeenth functional relationship between the time domain position of the first signal and the time domain position offset of the first signal and the parameter of the time domain position of the subframe where the target reference signal is located;

An eighteenth functional relationship between the time domain position of the first signal and the time domain position offset of the first signal and the parameter of the time domain position of the slot where the target reference signal is located;

A nineteenth functional relationship between the time domain position of the first signal and the time domain position offset of the first signal and the parameter of the time domain position of the symbol where the target reference signal is located;

A twentieth functional relationship between the time domain position of the first signal and the time domain position offset of the first signal and the parameter of the time domain position of Mo of the target reference signal is located.

It should be noted that since the time domain position of the first signal includes time domain position of radio frame, subframe, slot, symbol, and MO, and the time domain position offset of the first signal includes the offset of radio frame, subframe, slot, symbol, and MO, therefore, in the embodiment, the time domain position of the first signal can include time domain position of radio frame, subframe, slot, symbol, MO, and the time domain position offset of the first signal includes offsets of radio frames, subframes, slots, symbols, and MOs, the above are combined to obtain specific functional relationships included in the above functional relationships.

For example, the eleventh functional relationship between the time domain position of the first signal and the time domain position offset of the first signal and the time domain position of the radio frame where the target reference signal is located may include at least one of the following:

A functional relationship between the time domain position of the radio frame where the first signal is located and the radio frame offset of the first signal and the time domain position of the radio frame where the target reference signal is located;

A functional relationship between the time domain position of the subframe where the first signal is located and the subframe offset of the first signal and the time domain position of the radio frame where the target reference signal is located;

A functional relationship between the time domain position of the slot where the first signal is located and the slot offset of the first signal and the time domain position of the radio frame where the target reference signal is located;

A functional relationship between the time domain position of the symbol where the first signal is located and the symbol offset of the first signal and the time domain position of the radio frame where the target reference signal is located;

A functional relationship between the time domain position of MO where the first signal is located and the MO offset/symbol offset of the first signal and the time domain position of the radio frame where the target reference signal is located.

The twelfth functional relationship between the time domain position of the first signal and the time domain position offset of the first signal and the time domain position of the subframe where the target reference signal is located may include at least one of the following:

A functional relationship between the time domain position of the subframe where the first signal is located and the subframe offset of the first signal and the time domain position of the subframe where the target reference signal is located;

A functional relationship between the time domain position of the slot where the first signal is located and the slot offset of the first signal and the time domain position of the subframe where the target reference signal is located;

A functional relationship between the time domain position of the symbol where the first signal is located and the symbol offset of the first signal and the time domain position of the subframe where the target reference signal is located;

A functional relationship between the time domain position of MO where the first signal is located and the MO offset/symbol offset of the first signal and the time domain position of the subframe where the target reference signal is located The thirteenth functional relationship between the time domain position of the first signal and the time domain position offset of the first signal and the time domain position of the slot where the target reference signal is located may include at least one of the following:

A functional relationship between the time domain position of the slot where the first signal is located and the slot offset of the first signal and the time domain position of the slot where the target reference signal is located;

A functional relationship between the time domain position of the symbol where the first signal is located and the symbol offset of the first signal and the time domain position of the slot where the target reference signal is located;

A functional relationship between the time domain position of MO where the first signal is located and the MO offset/symbol offset of the first signal and the time domain position of the slot where the target reference signal is located.

The fourteenth functional relationship between the time domain position of the first signal and the time domain position offset of the first signal and the time domain position of the symbol where the target reference signal is located may include at least one of the following:

A functional relationship between the time domain position of the symbol where the first signal is located and the symbol offset of the first signal and the time domain position of the symbol where the target reference signal is located;

A functional relationship between the time domain position of MO where the first signal is located and the MO offset/symbol offset of the first signal and the time domain position of the symbol where the target reference signal is located.

The fifteenth functional relationship between the time domain position of the first signal and the time domain position offset of the first signal and the time domain position of the MO of the target reference signal may include at least one of the following:

A functional relationship between the time domain position of MO where the first signal is located and the MO offset/symbol offset of the first signal and the time domain position of the MO of the target reference signal.

The sixteenth functional relationship between the time domain position of the first signal and the time domain position offset of the first signal and the parameter of the time domain position of the radio frame where the target reference signal is located may include at least one of the following:

A functional relationship between the time domain position of the radio frame where the first signal is located and the radio frame offset of the first signal and the parameter of the time domain position of the radio frame where the target reference signal is located;

A functional relationship between the time domain position of the subframe where the first signal is located and the subframe offset of the first signal and the parameter of the time domain position of the radio frame where the target reference signal is located;

A functional relationship between the time domain position of the slot where the first signal is located and the slot offset of the first signal and the parameter of the time domain position of the radio frame where the target reference signal is located;

A functional relationship between the time domain position of the symbol where the first signal is located and the symbol offset of the first signal and the parameter of the time domain position of the radio frame where the target reference signal is located;

A functional relationship between the time domain position of MO where the first signal is located and the MO offset/symbol offset of the first signal and the parameter of the time domain position of the radio frame where the target reference signal is located.

The seventeenth functional relationship between the time domain position of the first signal and the time domain position offset of the first signal and the parameter of the time domain position of the subframe where the target reference signal is located may include at least one of the following:

A functional relationship between the time domain position of the subframe where the first signal is located and the subframe offset of the first signal and the parameter of the time domain position of the subframe where the target reference signal is located;

A functional relationship between the time domain position of the slot where the first signal is located and the slot offset of the first signal and the parameter of the time domain position of the subframe where the target reference signal is located;

A functional relationship between the time domain position of the symbol where the first signal is located and the symbol offset of the first signal and the parameter of the time domain position of the subframe where the target reference signal is located;

A functional relationship between the time domain position of the MO where the first signal is located and the MO offset/symbol offset of the first signal and the parameter of the time domain position of the subframe where the target reference signal is located;

The eighteenth functional relationship between the time domain position of the first signal and the time domain position offset of the first signal and the parameter of time domain position of the slot where the target reference signal is located may include at least one of the following:

A functional relationship between the time domain position of the slot where the first signal is located and the slot offset of the first signal and the parameter of the time domain position of the slot where the target reference signal is located;

A functional relationship between the time domain position of the symbol where the first signal is located and the symbol offset of the first signal and the parameter of the time domain position of the slot where the target reference signal is located;

A functional relationship between the time domain position of the MO where the first signal is located and the MO offset/symbol offset of the first signal and the parameter of the time domain position of the slot where the target reference signal is located.

The nineteenth functional relationship between the time domain position of the first signal and the time domain position offset of the first signal and the parameter of the time domain position of the symbol where the target reference signal is located may include at least one of the following:

A functional relationship between the time domain position of the symbol where the first signal is located and the symbol offset of the first signal and the parameter of the time domain position of the symbol where the target reference signal is located;

A functional relationship between the time domain position of the MO where the first signal is located and the MO offset/symbol offset of the first signal and the parameter of the time domain position of the symbol where the target reference signal is located.

The twentieth functional relationship between the time domain position of the first signal and the time domain position offset of the first signal and the parameter of the time domain position of the MO of the target reference signal may include at least one of the following:

A functional relationship between the time domain position of the MO where the first signal is located and the MO offset/symbol offset of the first signal and the parameter of the time domain position of the MO of the target reference signal.

As an optional implementation, the method also includes:

determining, by the terminal, a time domain position of a first beam of the first signal;

Wherein, the time domain position of the first beam of the first signal has a functional relationship with a time domain position offset of the first beam of the first signal and the time domain position of the first signal; or The time domain position of the first beam of the first signal has a functional relationship with the time domain information of the target reference signal; or The time domain position of the first beam of the first signal has a functional relationship with the time domain position offset of the first beam of the first signal and the time domain information of the target reference signal.

Wherein, the first beam of the first signal may be the first beam of each first signal in a plurality of first signals, that is, in the case of a plurality of first signals, the time domain position of the first beam of each first signal may be determined, and the first beam may be one or more beams, that is, each first signal may correspond to one or more beams.

The time domain position offset of the first beam may be agreed in the protocol or pre-configured, and the time domain position offsets of different beams may be the same or different.

Optionally, a functional relationship between the time domain position of the first beam of the first signal and the time domain position offset of the first beam of the first signal and the time domain position of the first signal may include at least the following one item:

a twenty-first functional relationship between the time domain position of the first beam of the first signal and the time domain position offset of the first beam and the time domain position of the radio frame where the first signal is located;

a twenty-second functional relationship between the time domain position of the first beam of the first signal and the time domain position offset of the first beam and the time domain position of the subframe where the first signal is located;

a twenty-third functional relationship between the time domain position of the first beam of the first signal and the time domain position offset of the first beam and the time domain position of the slot where the first signal is located;

a twenty-fourth functional relationship between the time domain position of the first beam of the first signal and the time domain position offset of the first beam and the time domain position of the symbol where the first signal is located;

a twenty-fifth functional relationship between the time domain position of the first beam of the first signal and the time domain position offset of the first beam and the time domain position of the MO of the first signal.

For example, the twenty-first functional relationship between the time domain position of the first beam of the first signal and the time domain position offset of the first beam and the time domain position of the radio frame where the first signal is located may include at least one of the following:

A functional relationship between the radio frame where the first beam of the first signal is located and the time domain position offset of the first beam and the time domain position of the radio frame where the first signal is located;

A functional relationship between the subframe where the first beam of the first signal is located and the time domain position offset of the first beam and the time domain position of the radio frame where the first signal is located;

a functional relationship between the slot where the first beam of the first signal is located and the time domain position offset of the first beam and the time domain position of the radio frame where the first signal is located;

a functional relationship between the symbol where the first beam of the domain position of the radio frame where the first signal is located;

a functional relationship between the MO of the first beam of the first signal and the time domain position offset of the first beam and the time domain position of the radio frame where the first signal is located.

For example, the twenty-second functional relationship between the time domain position of the first beam of the first signal and the time domain position offset of the first beam and the time domain position of the subframe where the first signal is located may include at least one of the following:

A functional relationship between the subframe where the first beam of the first signal is located and the time domain position offset of the first beam and the time domain position of the subframe where the first signal is located;

A functional relationship between the slot where the first beam of the first signal is located and the time domain position offset of the first beam and the time domain position of the subframe where the first signal is located;

A functional relationship between the symbol where the first beam of the first signal is located and the time domain position offset of the first beam and the time domain position of the subframe where the first signal is located;

a functional relationship between the MO of the first beam of the first signal and the time domain position offset of the first beam and the time domain position of the subframe where the first signal is located.

For example, the twenty-third functional relationship between the time domain position of the first beam of the first signal and the time domain position offset of the first beam and the time domain position of the slot where the first signal is located may include at least one of the following:

A functional relationship between the slot where the first beam of the first signal is located and the time domain position offset of the first beam and the time domain position of the slot where the first signal is located;

A functional relationship between the symbol where the first beam of the domain position of the slot where the first signal is located;

A functional relationship between the MO of the first beam of the first signal and the time domain position offset of the first beam and the time domain position of the slot where the first signal is located.

For example, the twenty-fourth functional relationship between the time domain position of the first beam of the first signal and the time domain position offset of the first beam and the time domain position of the symbol where the first signal is located may include at least one of the following:

A functional relationship between the symbol where the first beam of the first signal is located and the time domain position offset of the first beam and the time domain position of the symbol where the first signal is located;

A functional relationship between the MO of the first beam of the first signal and the time domain position offset of the first beam and the time domain position of the symbol where the first signal is located.

For example: a twenty-fifth functional relationship between the time domain position of the first beam of the first signal and the time domain position offset of the first beam and the time domain position of the MO of the first signal may include at least one of the following:

a functional relationship between the MO of the first beam of the first signal and the time domain position offset of the first beam and the time domain position of the MO of the first signal.

Optionally, the time domain position of the first beam of the first signal having a functional relationship with the time domain information of the target reference signal includes at least one of the following:

A twenty-sixth functional relationship between the time domain position of the first beam of the first signal and the time domain position of the radio frame where the target reference signal is located;

A twenty-seventh functional relationship between the time domain position of the first beam of the first signal and the time domain position of the subframe where the target reference signal is located;

A twenty-eighth functional relationship between the time domain position of the first beam of the first signal and the time domain position of the slot where the target reference signal is located;

A twenty-ninth functional relationship between the time domain position of the first beam of the first signal and the time domain position of the symbol where the target reference signal is located;

A thirtieth functional relationship between the time domain position of the first beam of the first signal and the time domain position of the MO of the target reference signal;

A thirty-first functional relationship between the time domain position of the first beam of the first signal and the parameter of the time domain position of the radio frame where the target reference signal is located;

A thirty-second functional relationship between the time domain position of the first beam of the first signal and the parameter of the time domain position of the subframe where the target reference signal is located;

A thirty-third functional relationship between the time domain position of the first beam of the first signal and the parameter of the time domain position of the slot where the target reference signal is located;

A thirty-fourth functional relationship between the time domain position of the first beam of the first signal and the parameter of the time domain position of the symbol where the target reference signal is located;

A thirty-fifth functional relationship between the time domain position of the first beam of the first signal and the parameter of the time domain position of the MO of the target reference signal.

For example: the twenty-sixth functional relationship between the time domain position of the first beam of the first signal and the time domain position of the radio frame where the target reference signal is located may include at least one of the following:

A functional relationship between the radio frame where the first beam of the first signal is located and the time domain position of the radio frame where the target reference signal is located;

A functional relationship between the subframe where the first beam of the first signal is located and the time domain position of the radio frame where the target reference signal is located;

A functional relationship between the slot where the first beam of the first signal is located and the time domain position of the radio frame where the target reference signal is located;

A functional relationship between the symbol where the first beam of the first signal is located and the time domain position of the radio frame where the target reference signal is located;

A functional relationship between the MO of the first beam of the first signal and the time domain position of the radio frame where the target reference signal is located.

For example: the twenty-seventh functional relationship between the time domain position of the first beam of the first signal and the time domain position of the subframe where the target reference signal is located may include at least one of the following:

A functional relationship between the subframe where the first beam of the first signal is located and the time domain position of the subframe where the target reference signal is located;

A functional relationship between the slot where the first beam of the first signal is located and the time domain position of the subframe where the target reference signal is located;

A functional relationship between the symbol where the first beam of the first signal is located and the time domain position of the subframe where the target reference signal is located;

A functional relationship between the MO of the first beam of the first signal and the time domain position of the subframe where the target reference signal is located.

For example: the twenty-eighth functional relationship between the time domain position of the first beam of the first signal and the time domain position of the slot where the target reference signal is located may include at least one of the following:

A functional relationship between the slot where the first beam of the first signal is located and the time domain position of the slot where the target reference signal is located;

A functional relationship between the symbol where the first beam of the first signal is located and the time domain position of the slot where the target reference signal is located;

A functional relationship between the MO of the first beam of the first signal and the time domain position of the slot where the target reference signal is located.

For example: the twenty-ninth functional relationship between the time domain position of the first beam of the first signal and the time domain position of the symbol where the target reference signal is located may include at least one of the following:

A functional relationship between the symbol where the first beam of the first signal is located and the time domain position of the symbol where the target reference signal is located;

A functional relationship between the MO of the first beam of the first signal and the time domain position of the symbol where the target reference signal is located.

For example: the thirtieth functional relationship between the time domain position of the first beam of the first signal and the time domain position of the MO of the target reference signal may include at least one of the following:

A functional relationship between the MO of the first beam of the first signal and the time domain position of the MO of the target reference signal.

For example: the thirty-first functional relationship between the time domain position of the first beam of the first signal and the parameter of the time domain position of the radio frame where the target reference signal is located may include at least one of the following:

A functional relationship between the radio frame where the first beam of the first signal is located and the parameters of the time domain position of the radio frame where the target reference signal is located;

A functional relationship between the subframe where the first beam of the first signal is located and the parameter of the time domain position of the radio frame where the target reference signal is located;

A functional relationship between the slot where the first beam of the first signal is located and the parameter of the time domain position of the radio frame where the target reference signal is located;

A functional relationship between the symbol where the first beam of the first signal is located and the parameter of the time domain position of the radio frame where the target reference signal is located;

A functional relationship between the MO of the first beam of the first signal and the parameter of the time domain position of the radio frame where the target reference signal is located.

For example: the thirty-second functional relationship between the time domain position of the first beam of the first signal and the parameter of the time domain position of the subframe where the target reference signal is located may include at least one of the following:

A functional relationship between the subframe where the first beam of the first signal is located and the parameter of the time domain positions of the subframe where the target reference signal is located;

A functional relationship between the slot where the first beam of the first signal is located and the parameter of the time domain position of the subframe where the target reference signal is located;

A functional relationship between the symbol where the first beam of the first signal is located and the parameter of the time domain position of the subframe where the target reference signal is located;

A functional relationship between the MO of the first beam of the first signal and the parameter of the time domain position of the subframe where the target reference signal is located.

For example: the thirty-third functional relationship between the time domain position of the first beam of the first signal and the parameter of the time domain position of the slot where the target reference signal is located may include at least one of the following:

A functional relationship between the slot where the first beam of the first signal is located and the parameter of the time domain position of the slot where the target reference signal is located;

A functional relationship between the symbol where the first beam of the first signal is located and the parameter of the time domain position of the slot where the target reference signal is located;

A functional relationship between the MO of the first beam of the first signal and the parameter of the time domain position of the slot where the target reference signal is located.

For example: the thirty-fourth functional relationship between the time domain position of the first beam of the first signal and the parameter of the time domain position of the symbol where the target reference signal is located may include at least one of the following:

A functional relationship between the symbol where the first beam of the first signal is located and the parameter of the time domain position of the symbol where the target reference signal is located;

A functional relationship between the MO of the first beam of the first signal and the parameter of the time domain position of the symbol where the target reference signal is located.

For example: the thirty-fifth functional relationship between the time domain position of the first beam of the first signal and the parameter of the time domain position of the MO of the target reference signal may include at least one of the following:

A functional relationship between the MO of the first beam of the first signal and the parameter of the time domain position of the MO of the target reference signal.

Optionally, the functional relationship between the time domain position of the first beam of the first signal and the time domain position offset of the first beam of the first signal and the time domain information of the target reference signal includes at least one of the following:

A thirty-sixth functional relationship between the time domain position of the first beam of the first signal and the time domain position offset of the first beam and the time domain position of the radio frame where the target reference signal is located;

A thirty-seventh functional relationship between the time domain position of the first beam of the first signal and the time domain position offset of the first beam and the time domain position of the subframe where the target reference signal is located;

A thirty-eighth functional relationship between the time domain position of the first beam of the first signal and the time domain position offset of the first beam and the time domain position of the slot where the target reference signal is located;

A thirty-ninth functional relationship between the time domain position of the first beam of the first signal and the time domain position offset of the first beam and the time domain position of the symbol where the target reference signal is located;

A fortieth functional relationship between the time domain position of the first beam of the first signal and the time domain position offset of the first beam and the time domain position of the MO of the target reference signal;

A forty-first functional relationship between the time domain position of the first beam of the first signal and the time domain position offset of the first beam and the parameter of the time domain position of the radio frame where the target reference signal is located;

A forty-second functional relationship between the time domain position of the first beam of the first signal and the time domain position offset of the first beam and the parameter of the time domain position of the subframe where the target reference signal is located;

A forty-third functional relationship between the time domain position of the first beam of the first signal and the time domain position offset of the first beam and the parameter of the time domain position of the slot where the target reference signal is located;

A forty-fourth functional relationship between the time domain position of the first beam of the first signal and the time domain position offset of the first beam and the parameter of the time domain position of the symbol where the target reference signal is located;

A forty-fifth functional relationship between the time domain position of the first beam of the first signal and the time domain position offset of the first beam and the parameter of the time domain position of the MO of the target reference signal.

For example: the thirty-sixth functional relationship between the time domain position of the first beam of the first signal and the time domain position offset of the first beam and the time domain position of the radio frame where the target reference signal is located may include at least one of the following:

A functional relationship between the radio frame where the first beam of the first signal is located and the time domain position offset of the first beam and the time domain position of the radio frame where the target reference signal is located;

A functional relationship between the subframe where the first beam of the first signal is located and the time domain position offset of the first beam and the time domain position of the radio frame where the target reference signal is located;

A functional relationship between the slot where the first beam of the first signal is located and the time domain position offset of the first beam and the time domain position of the radio frame where the target reference signal is located;

A functional relationship between the symbol where the first beam of the domain position of the radio frame where the target reference signal is located;

A functional relationship between the MO of the first beam of the first signal and the time domain position offset of the first beam and the time domain position of the radio frame where the target reference signal is located.

For example: the thirty-seventh functional relationship between the time domain position of the first beam of the first signal and the time domain position offset of the first beam and the time domain position of the subframe where the target reference signal is located may include at least one of the following:

A functional relationship between the subframe where the first beam of the first signal is located and the time domain position offset of the first beam and the time domain position of the subframe where the target reference signal is located;

A functional relationship between the slot where the first beam of the first signal is located and the time domain position offset of the first beam and the time domain position of the subframe where the target reference signal is located;

A functional relationship between the symbol where the first beam of the first signal is located and the time domain position offset of the first beam and the time domain position of the subframe where the target reference signal is located;

A functional relationship between the MO of the first beam of the first signal and the time domain position offset of the first beam and the time domain position of the subframe where the target reference signal is located.

For example: a thirty-eighth functional relationship between the time domain position of the first beam of the first signal and the time domain position offset of the first beam and the time domain position of the slot where the target reference signal is located may include at least one of the following:

A functional relationship between the slot where the first beam of the first signal is located and the time domain position offset of the first beam and the time domain position of the slot where the target reference signal is located;

A functional relationship between the symbol where the first beam of the domain position of the slot where the target reference signal is located;

A functional relationship between the MO of the first beam of the first signal and the time domain position offset of the first beam and the time domain position of the slot where the target reference signal is located.

For example: the thirty-ninth functional relationship between the time domain position of the first beam of the first signal and the time domain position offset of the first beam and the time domain position of the symbol where the target reference signal is located may include at least one of the following:

A functional relationship between the symbol where the first beam of the first signal is located and the time domain position offset of the first beam and the time domain position of the symbol where the target reference signal is located;

A functional relationship between the MO of the first beam of the first signal and the time domain position offset of the first beam and the time domain position of the symbol where the target reference signal is located.

For example: the fortieth functional relationship between the time domain position of the first beam of the first signal and the time domain position offset of the first beam and the time domain position of the MO of the target reference signal may include at least one of the following:

A functional relationship between the MO of the first beam of the first signal and the time domain position offset of the first beam and the time domain position of the MO of the target reference signal.

For example: the forty-first function relationship between the time domain position of the first beam of the first signal and the time domain position offset of the first beam and the parameter of the time domain position of the radio frame where the target reference signal is located can include at least one of the following:

A functional relationship between the radio frame where the first beam of the first signal is located and the time domain position offset of the first beam and the parameter of the time domain position of the radio frame where the target reference signal is located;

A functional relationship between the subframe where the first beam of the first signal is located and the time domain position offset of the first beam and the parameter of the time domain position of the radio frame where the target reference signal is located;

A functional relationship between the slot where the first beam of the first signal is located and the time domain position offset of the first beam and the parameter of the time domain position of the radio frame where the target reference signal is located;

A functional relationship between the symbol where the first beam of the first signal is located and the time domain position offset of the first beam and the parameter of the time domain position of the radio frame where the target reference signal is located;

A functional relationship between the MO of the first beam of the first signal and the time domain position offset of the first beam and the parameter of the time domain position of the radio frame where the target reference signal is located.

For example: The forty-second functional relationship between the time domain position of the first beam of the first signal and the time domain position offset of the first beam and the parameter of the time domain position of the subframe where the target reference signal is located can include at least one of the following:

A functional relationship between the subframe where the first beam of the first signal is located and the time domain position offset of the first beam and the parameter of the time domain position of the subframe where the target reference signal is located;

A functional relationship between the slot where the first beam of the first signal is located and the time domain position offset of the first beam and the parameter of the time domain position of the subframe where the target reference signal is located;

A functional relationship between the symbol where the first beam of the first signal is located and the time domain position offset of the first beam and the parameter of the time domain position of the subframe where the target reference signal is located;

A functional relationship between the MO of the first beam of the first signal and the time domain position offset of the first beam and the time domain position of the subframe where the target reference signal is located.

For example: the forty-third functional relationship between the time domain position of the first beam of the first signal and the time domain position offset of the first beam and the parameter of the time domain position of the slot where the target reference signal is located can include at least one of the following:

A functional relationship between the slot where the first beam of the first signal is located and the time domain position offset of the first beam and the parameter of the time domain position of the slot where the target reference signal is located;

A functional relationship between the symbol where the first beam of the first signal is located and the time domain position offset of the first beam and the parameter of the time domain position of the slot where the target reference signal is located;

A functional relationship between the MO of the first beam of the first signal and the time domain position offset of the first beam and the parameter of the time domain position of the slot where the target reference signal is located.

For example: a forty-fourth functional relationship between the time domain position of the first beam of the first signal and the time domain position offset of the first beam and the parameter of the time domain position of the symbol where the target reference signal is located may include at least one of the following:

A functional relationship between the symbol where the first beam of the first signal is located and the time domain position offset of the first beam and the parameter of the time domain position of the symbol where the target reference signal is located;

A functional relationship between the MO of the first beam of the first signal and the time domain position offset of the first beam and the parameter of the time domain position of the symbol where the target reference signal is located.

For example: the forty-fifth functional relationship between the time domain position of the first beam of the first signal and the time domain position offset of the first beam and the parameter of the time domain position of the MO of the target reference signal may include at least one of the following:

A functional relationship between the MO of the first beam of the first signal and the time domain position offset of the first beam and the parameter of the time domain position of the MO of the target reference signal.

It should be noted that, in the embodiment of the present disclosure, the first signal includes at least one of TRS, CSI-RS, and PEI, and the target reference signal includes at least one of paging message, SSB, TRS, CSI-RS, and PEI, therefore, in the embodiments of the present disclosure, all the functional relationships described can replace the target reference signal with at least one of the paging message, SSB, TRS, CSI-RS, PEI, that is, the functional relationship between at least one of the paging message, SSB, TRS, CSI-RS, PEI and the time domain position of the first signal, and the functional relationship between at least one of paging message, SSB, TRS, CSI-RS, PEI and the time domain position of the first beam of the first signal. In the following, the target reference signal is taken as the paging message for example, or the target reference signal is taken as the paging message and SSB for example, and the first signal is taken as TRS/CSI-RS for example, the signal receiving method provided by the embodiment of the present disclosure is described.

Example 1

In this embodiment, the terminal uses a predefined formula to calculate the position of the TRS/CSI-RS. Specifically, it can include the following:

Step 1: The terminal receives the configured parameters of the TRS/CSI-RS.

Wherein, the parameter of TRS/CSI-RS may be configured by SIB and/or MIB.

The SIBs may include:

SIB1, SIB2, SIB3, SIB4, SIB5, SIB6, SIB7, SIB8, SIB9, SIB10, SIB11, SIB12, SIB13, SIB14, and other SIB formats are not excluded.

The parameter configuration of the TRS/CSI-RS signal may include cell-specific or UE-group-specific parameter configuration. For example, TRS/CSI-RS period (cell level, UE-group level), frequency domain resource position parameters of TRS/CSI-RS, TRS/CSI-RS ID, terminal grouping ID of TRS/CSI-RS, the time domain position offset of the terminal grouping.

The parameter configuration of the TRS/CSI-RS can be one TRS/CSI-RS resource or resource set configured as one period; or it can be multiple TRS/CSI-RS resources or resource sets configured as different periods; or, multiple TRS/CSI-RS resources or resource sets configured as the same period and different time domain offsets.

In addition, the information in steps 2 and 3 below may also be configured by SIB or MIB signaling.

Step 2: The terminal calculates the time domain position of the TRS/CSI-RS according to a predefined formula. The details can be as follows:

The time domain position of the TRS/CSI-RS is determined by at least one of the following parameters:

The time domain position of the target radio frame where the PDCCH of the paging message is located, the time domain position of the target subframe or slot where the PDCCH of the paging message is located, and the time domain position of the target paging monitoring MO of the PDCCH of the paging message;

Wherein, the paging message includes at least one of paging of the terminal, emergency message (for example: ETWS message, business information, for example: CMSA), and system message update.

Wherein, the time domain position of the TRS/CSI-RS includes the starting position of the time domain of the TRS/CSI-RS, and/or the end position of the time domain of the TRS/CSI-RS, and/or the time domain position of transmission/reception of TRS/CSI-RS between the starting position and the end position of the time domain of TRS/CSI-RS.

Wherein, the time domain position of the target radio frame where the PDCCH of the paging message is located may be the starting time domain position of the target radio frame, or the end time domain position of the target radio frame. The time domain position of the target subframe where the PDCCH of the paging message is located may be the starting time domain position of the target subframe, or the end time domain position of the target subframe; wherein, the time domain position of the target slot where the PDCCH of the paging message is located may be the starting time domain position of the target slot, or the end time domain position of the target slot; wherein, the time domain position of the target paging monitoring position MO of the PDCCH of the paging message may be the starting time domain position of the paging target monitoring position MO, or the ending time domain position of the target monitoring position MO of the paging message.

The above specific calculation methods may include:

The first type: the time domain position where the TRS/CSI-RS is located is determined by the time domain position of the target of the paging message. Specifically, the following schemes can be adopted:

1-1: The time domain position of the TRS/CSI-RS is determined by the position of the target radio frame PF of the paging message, which can be expressed as a function F1 (PF_SFN) of the time domain position of the radio frame of the PDCCH where the paging message is located, wherein, PF_SFN is the time domain position of the radio frame of the PDCCH where the paging message is located, and its position can be obtained by the definition of the protocol, and F1 is a functional relationship from PF_SFN to the time domain position of the radio frame of the TRS/CSI-RS. Further, the time domain position of at least one of the subframe, slot, symbol and MO in the radio frame of the TRS/CSI-RS may be configured by signaling, for example, SIB signaling or MIB signaling.

The functional relationship F1 can be expressed as Y=X, that is, TRS/CSI-RS_SFN=PF_SFN, or Y=X+offset, that is, TRS/CSI-RS_SFN=PF_SFN+TRS/CSI-RS_SFN_offset, wherein, TRS/CSI-RS_SFN indicates the time domain position of the radio frame where the TRS/CSI-RS is located, and TRS/CSI-RS_SFN_offset indicates the radio frame offset of the TRS/CSI-RS, which can be specifically expressed as the offset of the radio frame from the time domain position of the radio frame where the TRS/CSI-RS is located to the time domain position of the radio frame where the paging message is located, that is, the time domain position of the radio frame where the TRS/CSI-RS_SFN is located is determined by the time domain position of the target radio frame PF_SFN where the PDCCH of the paging message is located, or determined by the time domain position of the radio frame whose offset is TRS/CSI-RS_SFN_offset relative to the time domain position of the target radio frame where the PDCCH of the paging message is located.

Further, the time domain position of the TRS/CSI-RS relative to the slot of the radio frame TRS/CSI-RS_slot=TRS/CSI-RS_SFN*the number of subframes in each radio frame*the number of slots in each subframe+TRS/CSI-RS_slot_offset, where TRS/CSI-RS_slot_offset is the slot offset of each TRS/CSI-RS, which can be the slot offset between the time domain position of the slot where each TRS/CSI-RS is located and the time domain position of the radio frame of the TRS/CSI-RS, the slot offset may be configured by signaling. Further, the time domain position of the TRS/CSI-RS relative to the symbol of the slot, TRS/CSI-RS_symbol=[TRS/CSI-RS_SFN*the number of subframes in the radio frame*the number of the slots in each subframe+TRS/CSI-RS_slot_offset (SIB configuration)]+TRS/CSI-RS_symbol_offset, where TRS/CSI-RS_symbol_offset is the symbol offset of the TRS/CSI-RS, which can specifically be the time domain position offset of TRS/CSI-RS relative to the symbol of the slot of the TRS/CSI-RS, or the time domain position offset of TRS/CSI-RS relative to the symbol of the time domain position of the radio frame where the TRS/CSI-RS is located.

Further, the TRS/CSI-RS_slot_offset may be specific to the cell, that is, the time domain position offset of the TRS/CSI-RS slots of all TRS/CSI-RS terminals under each cell are the same. It can also be specific to the terminal group, that is, the time domain position offset of the TRS/CSI-RS_slot of each terminal group under each cell is the same, or it can be specific to the terminal, that is, the time domain position offset of the slot of each TRS/CSI-RS can be configured differently for each terminal. When TRS/CSI-RS_slot_offset is configured as a cell-specific parameter, that is, the time domain offset from the time domain position of TRS/CSI-RS to the time domain position of the target radio frame of PDCCH where all paging messages are located is the same, Further, the time domain offset from the time domain position of the TRS/CSI-RS to the time domain position of the target slot PO of the PDCCH where each paging message is located in the radio frame of each paging message, and the time domain position of target first effective MO of each PO monitoring position can be different; when TRS/CSI-RS_slot_offset is configured as terminal group-specific or terminal-specific, that is, the time domain position offset of TRS/CSI of each terminal group or each terminal can be configured to be different.

Further, the TRS/CSI-RS_symbol_offset, which is consistent with TRS/CSI-RS_slot_offset, may be cell-specific, that is, the time domain position offset of the TRS/CSI-RS symbol of each terminal group under each cell are the same, or it is terminal-specific, that is, the time domain position offset of each TRS/CSI-RS symbol can be configured differently for each terminal. When the TRS/CSI-RS_symbol_offset is configured as a cell-specific parameter, that is, the time domain offsets from the time domain position of the TRS/CSI-RS to the time domain position of the target radio frame of the PDCCH where all paging messages are located are the same. Further, the time domain offset from the time domain position of the TRS/CSI-RS to the time domain position of the target slot PO of the PDCCH where each paging message is located in the radio frame of each paging message, and the time domain position of target first effective MO of each PO monitoring position can be different; when TRS/CSI-RS_symbol_offset is configured as terminal group-specific or terminal-specific, that is, the time domain position offset of TRS/CSI-RS of each terminal group or each terminal can be configured to be different.

1-2: The time domain position of the TRS/CSI-RS is determined by the time domain position of the target position PO of the slot where the paging message is located, which can be expressed as Function F2(PO_slot), or F3(PF_SFN, PO_slot) of the time domain position of the target slot of the PDCCH where the paging message is located; among them, PF_SFN is the same as PF_SFN in the 1-1 scheme, and PO_slot is the time domain position of the slot of the target PDCCH where the paging message is located, and its position can be defined by the protocol, F2 is the function mapping from PO_slot to the time domain position of the TRS/CSI-RS slot, and F3 is PF_SFN, function mapping from at least one variable in PO_slot to the time domain position of the TRS/CSI-RS slot. Further, the time domain position of the TRS/CSI-RS relative to the symbols in the slot may be configured by signaling, for example, SIB signaling or MIB signaling.

The functional relationship F2 can be expressed as, Y=X, that is, TRS/CSI-RS_slot=PO_slot, or, TRS/CSI-RS_slot=PF_SFN*the number of subframes of each radio frame*the number of slots of each subframe+PO_slot; or, Y=X+offset, that is, TRS/CSI-RS_slot=PO_slot+TRS/CSI-RS_slot_offset, or, TRS/CSI-RS_slot=PF_SFN*the number of subframes of each radio frame*the number of slots in each subframe+PO_slot+TRS/CSI-RS_slot_offset; among them, TRS/CSI-RS_slot indicates the time domain position of the slot where the TRS/CSI-RS is located, and TRS/CSI-RS_slot_offset indicates the slot offset of the TRS/CSI-RS Specifically, it can be expressed as the slot offset from the time domain position of the slot where the TRS/CSI-RS is located to the time domain position of the target slot PO where the paging message is located, that is, the time domain position where the TRS/CSI-RS_slot is located is determined by the time domain position of the target slot PO where the PDCCH of the paging message is located, or determined by the time domain offset of the slot whose offset is TRS/CSI-RS_slot_offset relative to the time domain position of the target slot PO where the PDCCH of the paging message is located.

Further, the time domain position of the TRS/CSI-RS symbol is the same as the solution described in 1-1.

Further, the configuration of the time domain offset TRS/CSI-RS_slot_offset of the TRS/CSI-RS slot is the same as the solution described in 1-1.

Further, the configuration of the time domain offset TRS/CSI-RS_symbol_offset of the TRS/CSI-RS symbol is the same as the solution described in 1-1.

1-3: The time domain position of the symbol where the TRS/CSI-RS is located is determined by the time domain position of the target monitoring position MO of the slot position PO where the paging message is located, which can be expressed as F4(PO__MO_symbol), or F5(PO_slot, MO_symbol), or F6(PF_SFN, PO_slot, MO_symbol), or, F7(PO__MO_symbol, TRS/CSI-RS_symbol_offset), or F8(PO_slot, MO_symbol, TRS/CSI-RS_symbol_offset), or F9(PF_SFN, PO_slot, MO_symbol, TRS/CSI-RS_symbol_offset). Among them, PF_SFN and PO_slot are the same as the above 1-1, 1-2 schemes. PO_MO_symbol is the time domain position of the PO target monitoring position MO of the PDCCH where the paging message is located, its position is defined by the protocol, for example, SIB signaling configuration, or the terminal obtains the time domain position of the monitoring position of the first effective target MO according to the time domain position of the target slot of PO where the PDCCH is located and the search space of the paging message; F4 is the functional relationship of the time domain position of the symbol where the TRS/CSI-RS is located and the time domain position of the target first effective MO of the monitoring position of PO of PDCCH wherein the paging message is located; F5 is the functional relationship of at least one variable in the time domain position of the symbol where the TRS/CSI-RS is located and the time domain position of the target monitoring position PO of the PDCCH where the paging message is located, and the time domain position of the target first effective MO; F6 is the functional relationship of at least one variable in the time domain position of the symbol where the TRS/CSI-RS is located and the time domain position of the target radio frame PO_SFN of the PDCCH where the paging message is located, and the time domain position of the target slot PO_slot, or the time domain position of PO, the time domain position of the target monitoring position MO; F7 is the functional relationship of at least one variable in the time domain position of the symbol where the TRS/CSI-RS is located and the time domain position of the first effective MO of the monitoring position of the PO of the PDCCH where the paging message is located and the time domain position offset of the symbol position of the TRS/CSI-RS; F8 is the functional relationship of at least one variable in the time domain position of the symbol where the TRS/CSI-RS is located and the time domain position of the target monitoring position PO of the PDCCH where the paging message is located and the time domain position of the target first effective MO; F9 is functional relationship of at least one variable in the time domain position of the symbol where the TRS/CSI-RS is located, the time domain position of the target radio frame PO_SFN of the PDCCH where the paging message is located, the time domain position of the target slot PO_slot, or the time domain position of the target slot PO, and the time domain position of the target monitoring position MO and the time domain position offset of the symbol of the TRS/CSI-RS.

The above functional relationship F4, F5, F6 can be expressed as, Y=X, that is, TRS/CSI-RS_symbol=PO_MO_symbol, or TRS/CSI-RS_symbol=PO_slot*the number of symbols of each slot+PO_MO_symbol, or TRS/CSI-RS_symbol=PF_SFN*the number of subframes of each radio frame*the number of slots of each subframe*the number of symbols of each slot+PO_MO_symbol; F7, F8, F9 can be expressed as, Y=X+offset, ie, TRS/CSI-RS_symbol=PO_MO_symbol+TRS/CSI-RS_symbol_offset, or TRS/CSI-RS_symbol=PO_slot*the number of symbols of each slot+PO_MO_symbol+TRS/CSI-RS_symbol_offset, or TRS/CSI-RS_symbol=PF_SFN*the number of subframes of each radio frame*the number of slots of each subframe*the number of symbols of each slot+PO_MO_symbol+TRS/CSI-RS_symbol_offset; where, TRS/CSI-RS_symbol_offset represents the symbol offset of TRS/CSI-RS, specifically the symbol offset between the symbol where the TRS/CSI-RS is located and the time domain position of the first effective MO of the PO monitoring position of the PDCCH where the paging message is located.

Further, the offset TRS/CSI-RS_symbol_offset of the time domain position of the symbol of the TRS/CSI-RS is the same as the 1-1, 1-2.

Figure 3:
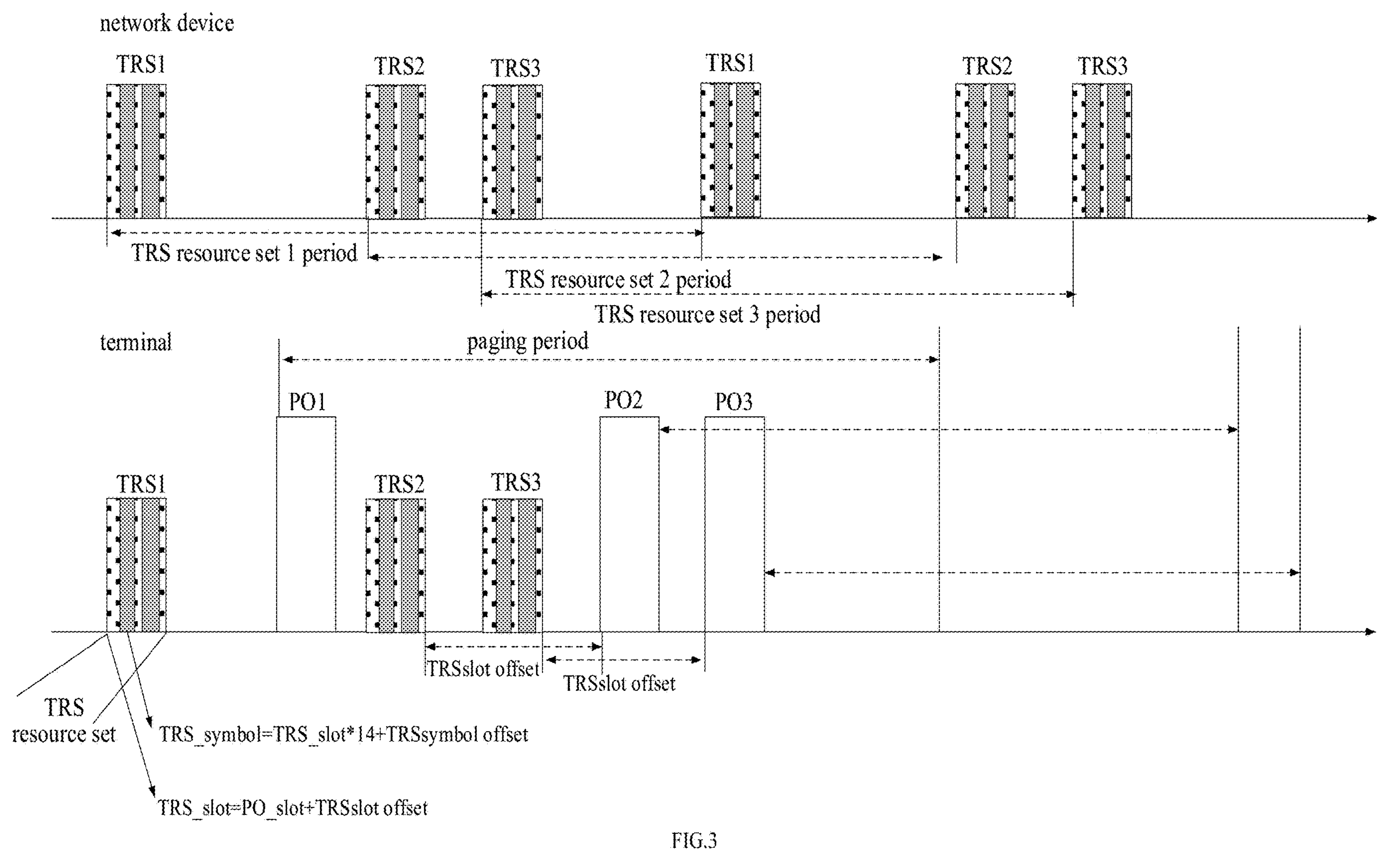
FIGS. 3 to 9 are schematic diagrams of time domain positions according to an embodiment of the present disclosure.

For example: as shown in FIG. 3, the time domain position of the TRS/CSI-RS is determined according to the time domain position of the target PO, which is configured as multiple TRS/CSI-RS resource sets (TRS/CSI-RS resource set) and periods, each PO corresponds to configure one TRS/CSI-RS resource set, and the offset configuration from each TRS/CSI-RS time domain position to the time domain position of different target POs is the same.

Figure 4:
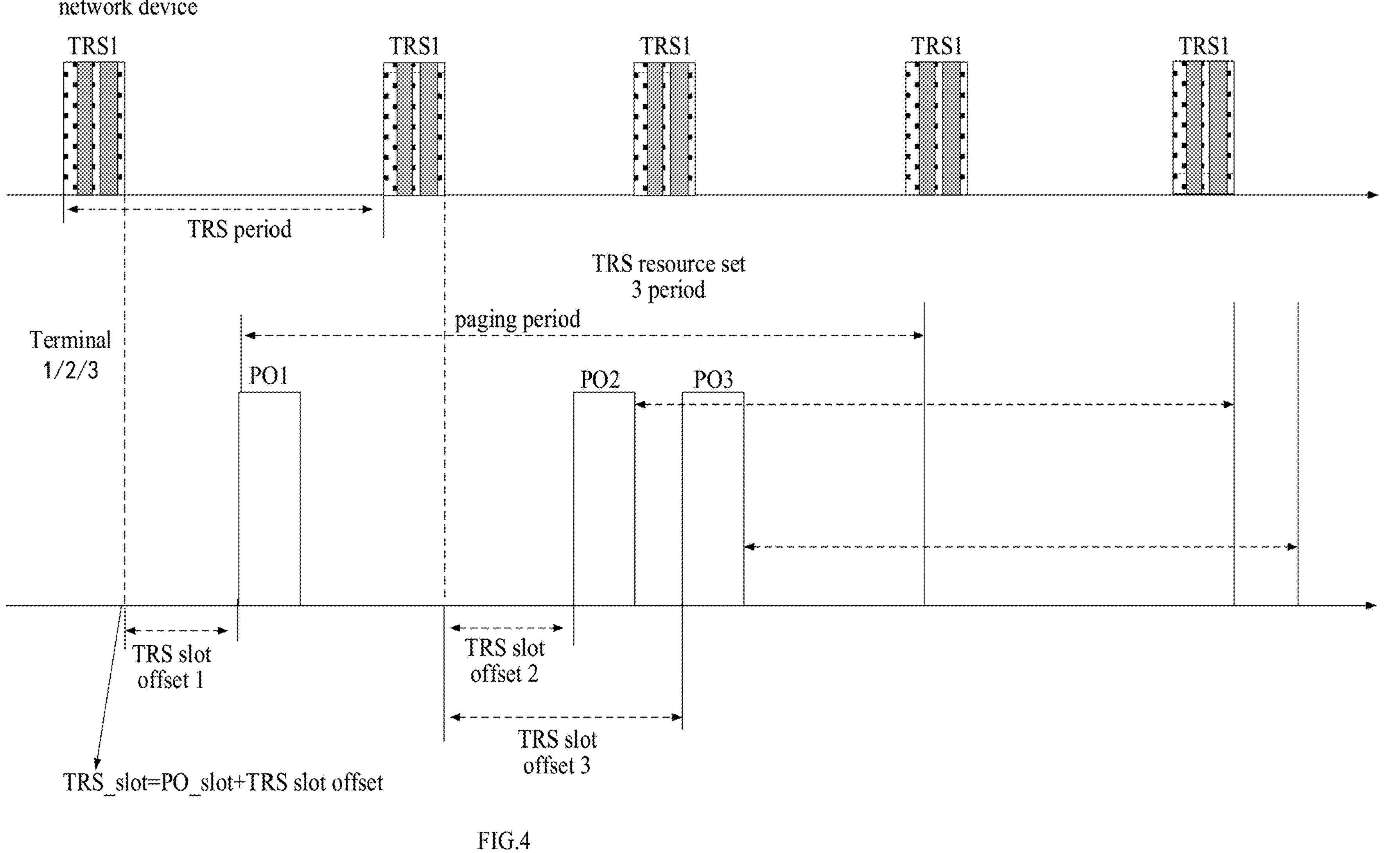

Another example: as shown in FIG. 4, the time domain position of the TRS/CSI-RS slot is determined according to the time domain position of the target PO, only one TRS/CSI-RS period is configured, and the offsets of the time domain positions of target PO corresponding to each TRS/CSI-RS are different.

The second type: the starting position of the time domain where the TRS/CSI-RS is located is determined by the parameter of the time domain position of the paging message.

The parameters of the paging message include at least one of the following:

PF, SFN, PF_offset, T, N, UE_ID, Ns, i_s, MO position of the first PDCCH monitored in PO;

Wherein, PF represents the time domain position of the target radio frame where the paging message is located, SFN represents the serial number of the time domain position of the target radio frame of the paging message, and PF_offset represents the time domain position offset of the target radio frame of the paging message, T represents the paging period, N is the number of PFs in one paging period, UE_ID can be the Temporary Mobile Subscriber Identity (Serving—Temporary Mobile Subscriber Identity, S-TMSI) mod 1024, Ns is the number of POs associated under one PF, i_s is the logical sequence number of the PO that appears after it belongs to the PF; among them, the position of the MO of the first PDCCH monitored in the PO can be configured by signaling, and can be the position of the first effective MO detected by the terminal based on the configuration of the search space, and then can be found according to a fixed rule numbering index.

Further, for calculating the time domain position of TRS/CSI-RS, the above parameters can also be expressed as follows. T represents the period of TRS/CSI-RS, and N represents the number of the radio frames of the TRS/CSI-RS in each TRS/CSI-RS period, Ns represents the number of sets of TRS/CSI-RS time domain positions associated with each radio frame, i_s represents the logic serial number appeared after the combination of time domain position of TRS/CSI-RS and its own radio frame; the number of time domain positions of TRS/CSI-RS associated with each radio frame corresponds to the number of target POs associated with the radio frame where the PDCCH of the paging message is located; the time domain position set of TRS/CSI-RS may correspond to the time domain position of the target PO.

Specifically, the following methods can be used:

1-4: The time domain position where the TRS/CSI-RS is located is determined by the parameter of the time domain position of the target radio frame of the paging message, which can be expressed as a function of the parameter of the time domain position of the target radio frame of the PDCCH where the paging message is located F10 (T, N, SFN, PF_offset, ID, TRS/CSI-RS_SFN_offset), where, T, N, PF_offset as described above, ID, can be UE-ID, or UE-group-ID, or other configured ID, TRS/CSI-RS_SFN_offset indicates the time domain position offset of the radio frame associated with the TRS/CSI-RS, which may be configured by signaling. F10 is a functional relationship between at least one variable of T, N, SFN, ID, PF_offset, and the time domain position offset of the radio frame of TRS/CSI-RS to the time domain position of the radio frame of TRS/CSI-RS. Further, the time domain position of the TRS/CSI-RS relative to the slot of the radio frame and/or the time domain position of the symbol may be configured by signaling, for example, SIB signaling or MIB signaling. The method is the same as that described in 1-1.

The above functional relationship F10 can be expressed as (TRS/CSI-RS_SFN+TRS/CSI-RS_SFN_offset) mod T=(T div N)*(ID mod N), where TRS/CSI-RS_SFN represents the time domain position of the radio frame of TRS/CSI-RS, T, N, ID, is the same as the above description, TRS/CSI-RS SFNF offset is the time domain position offset of the associated radio frame; wherein, TRS/CSI-RS_SFN_offset can be the same as PF_offset, or can also be configured.

Further, the time domain position of the slot of the TRS/CSI-RS are the same as those described in 1-1, 1-2, and 1-3.

Further, the time domain position of the symbol of TRS/CSI-RS are the same as those described in 1-1, 1-2, and 1-3.

Further, the configuration of the time domain position offset TRS/CSI-RS_slot_offset of the TRS/CSI-RS slot is the same as that described in 1-1, 1-2, and 1-3.

Further, the configuration of the time domain position offset TRS/CSI-RS_symbol_offset of the TRS/CSI-RS symbol is the same as that described in 1-1, 1-2, and 1-3.

1-5: The time domain position where the TRS/CSI-RS is located is determined by the parameter of the time domain position of the PDCCH target slot PO of the paging message, which can be expressed as function F11(N, Ns, ID) of the parameter of the time domain position of the PDCCH target slot PO where the paging message is located, wherein, N, Ns, ID are as described above. F11 is a functional relationship between at least one variable among N, Ns, ID and the time domain position of the slot where the TRS/CSI-RS is located. Further, the time domain position of the TRS/CSI-RS relative to the slot of the radio frame and/or the time domain position of the symbol may be configured by signaling, for example, SIB signaling or MIB signaling. The method is the same as the description in 1-1.

Figure 5:
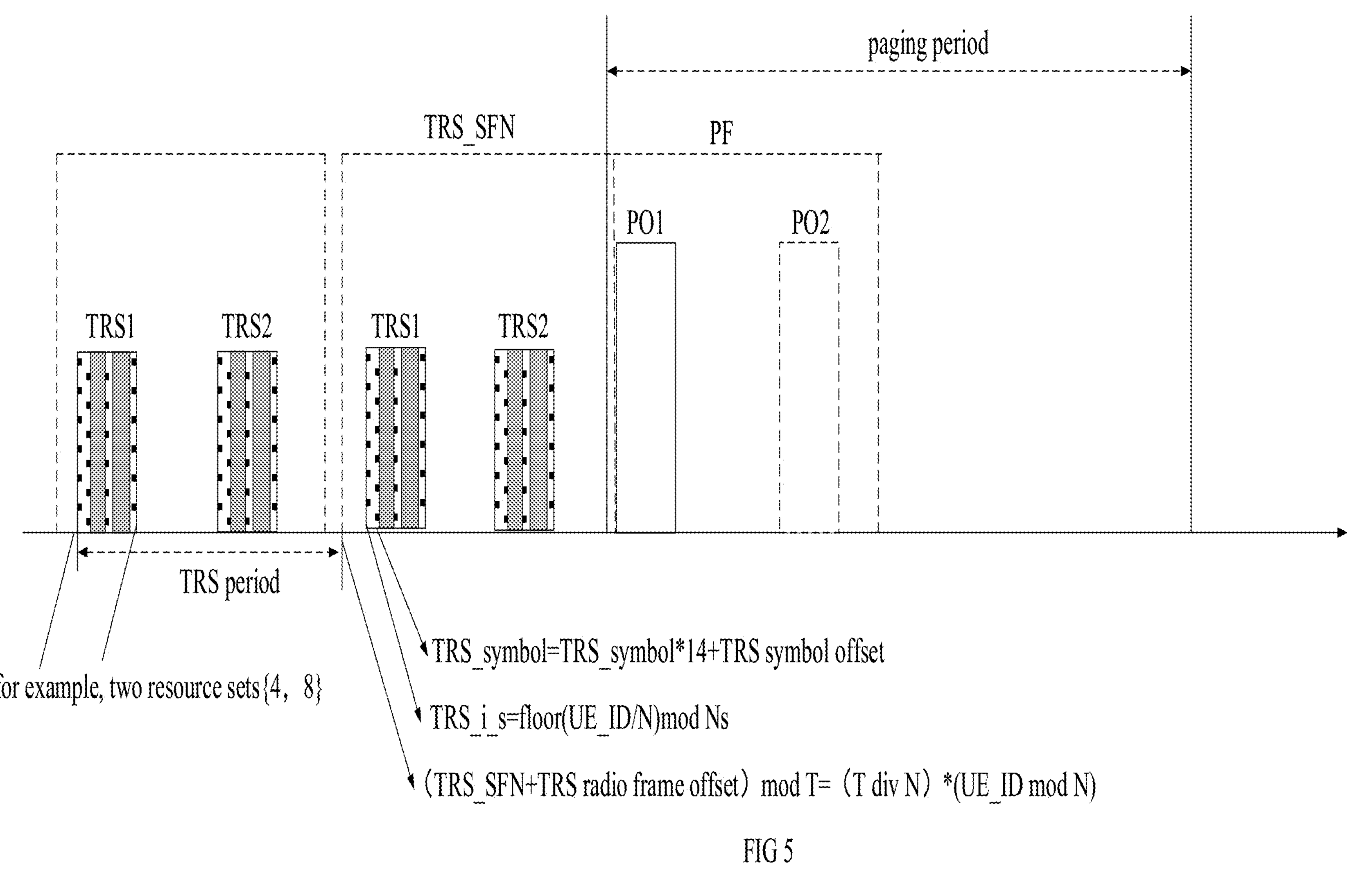

The functional relationship F11 can be expressed as TRS/CSI-RS_i_s=floor(ID/N) mod Ns, wherein, ID, N, Ns, is the same as that described above; TRS/CSI-RS_i_s indicates the logic index of the TRS/CSI-RS relative to or after the time domain position of the radio frame of the TRS/CSI-RS, which indicates the time domain position of the TRS/CSI-RS slot of i_s in the radio frame of the TRS/CSI-RS. Further, the time domain position offset of the TRS/CSI-RS symbol is the same as the description in 1-1 to 1-5. Specifically, as shown in FIG. 5, the time domain position of the TRS/CSI-RS slot can be determined according to the parameters of the target PO.

Further, the time domain position of the slot corresponding to the TRS/CSI-RS_i_s is the set of the time domain positions of the slots of the i_sth TRS/CSI-RS in the first time window of the starting position of the time domain position of the radio frame corresponding to TRS/CSI-RS, or the set of the time domain positions of the slots of the i_sth TRS/CSI-RS in the second time window of the end position of the time domain position of the radio frame corresponding to TRS/CSI-RS.

Further, the first time domain offset TRS/CSI-RS_i_s_slot_offset of the time domain position of the TRS/CSI-RS_slot relative to the time domain position of the corresponding radio frame may be different for each TRS/CSI-The RS_i_s, which depends on the time domain position of the effective TRS/CSI-RS_slot and/or symbol; it can be the same for each TRS/CSI-RS_i_s, that is, within the interval of the radio frame associated with the TRS/CSI-RS at this time, the offset of each TRS/CSI-RS from the time domain position of the slot of the associated target PO is the same.

Further, the time domain positions of the symbols of the TRS/CSI-RS are the same as those described in 1-1 to 1-4.

Further, the configuration of the TRS/CSI-RS_OFDM_offset is the same as the description in 1-1 to 1-4.

1-6: The time domain position where the TRS/CSI-RS is located is determined by the parameter of the time domain position of the target first effective monitoring MO of the slot PO of the PDCCH of the paging message, which can be expressed as the function F12 of the parameter of the time domain position of the target first effective monitoring MO of the PO_slot of the PDCCH where the paging message is located (the position of the MO of the first PDCCH monitored in the PO, TRS/CSI-RS_symbol_offset), wherein, TRS/CSI-RS_symbol_offset indicates that the time domain position offset of the symbol where TRS/CSI-RS is located, which may be configured by signaling; the time domain position of the MO of the first PDCCH monitored in the PO is as described above. F12 is the functional relationship among the time domain position offset of the symbol where the TRS/CSI-RS is located, and at least one variable in the time domain position of the MO of the first PDCCH monitored in the PO and the time domain position of the TRS/CSI-RS.

F12 can be expressed as, TRS/CSI-RS_symbol=MO position of the first PDCCH monitored in PO+TRS/CSI-RS_symbol_offset.

Further, the configuration of the TRS/CSI-RS_symbol_offset is the same as the description in 1-1 to 1-5.

Step 3: The terminal receives the TRS/CSI-RS at the time domain position of the TRS/CSI-RS according to the time domain position of the TRS/CSI-RS.

Example 2

This embodiment mainly describes the position configuration of multiple TRS/CSI-RS. The details can be as follows:

Step 1: The terminal receives the parameters of the configured TRS/CSI-RS signal.

This step can be described with example 1.

Step 2: The terminal calculates the position of the TRS/CSI-RS according to a predefined formula.

The difference between this step and step 2 of the example 1 is:

Multiple TRS/CSI-RSs are composed of multiple beams, and each TRS/CSI-RS corresponds to one beam, or each TRS/CSI-RS corresponds to at least two beams. Further, the TRS/CSI-RS may be one TRS/CSI-RS resource, or one TRS/CSI-RS resource set.

The time domain position of the TRS/CSI-RS can be obtained by the method in example 1. Further, the time domain position of each TRS/CSI-RS beam is determined by the time domain position of the TRS/CSI-RS and the parameter configuration of the TRS/CSI-RS resources. Wherein, the parameter configuration of the TRS/CSI-RS resource includes: beam configuration of the TRS/CSI-RS resource, and each beam is configured with associated time domain position and frequency domain position.

Further, the target beam of the TRS/CSI-RS (that is, the first beam) may be associated with at least one of the following beams:

Beam of SSB, beam of MO of paging messages.

Specifically, the time domain position of the target beam of the TRS/CSI-RS may be determined according to at least one of the beam of the SSB and the beam of the MO of the paging message.

Further, the time domain position of the target beam of the TRS/CSI-RS may be expressed as a function of the time domain position of the target reference; the function of the time domain position of the target reference may be the time domain position offset of the target reference, the time domain position offset of the target beam of the TRS/CSI-RS relative to the time domain position of the target reference can be configured by signaling, for example, SIB or MIB signaling; or can be determined by (the time domain position of the reference position of the target+duration); wherein, the duration may be the duration of each beam of the TRS/CSI-RS, or may be the duration of the monitoring position MO of the paging message.

Specifically, the calculation methods include:

2-1: The time domain position of the target beam of the TRS/CSI-RS can be expressed as a function F13 (TRS/CSI-RS_SFN, TRS/CSI-RS_beam_i_offset) of the time domain position of the radio frame where the TRS/CSI-RS is located, where, TRS/CSI-RS_SFN indicates the time domain position of the radio frame where the TRS/CSI-RS is located, and TRS/CSI-RS_beam_i_offset indicates the time domain position offset of the i-th beam of the TRS/CSI-RS.

The functional relationship F13 can be expressed as, Y=X+offset, that is, TRS/CSI-RS_beam_i=TRS/CSI-RS_SFN*the number of subframes of each radio frame*the number of each subframe*the number of slots of each subframe*the number of symbols of each slot+TRS/CSI-RS_beam_i_offset. Wherein, the TRS/CSI-RS_SFN is the same as above, and its calculation method is obtained from Example 1. TRS/CSI-RS_beam_i_offset is the same as above, that is, the time domain position of the i-th beam of the TRS/CSI-RS is determined by the radio frame where the TRS/CSI-RS is located and the offset of the i-th beam of the TRS/CSI-RS.

Further, the offset TRS/CSI-RS_beam_i_offset of the time domain position of the i-th beam of the TRS/CSI-RS may be cell-specific, that is, the time domain position offset of the i-th beam of the TRS/CSI-RS of all TRS/CSI-RS terminals under each cell is the same, and may be specific to the terminal group, that is, the position offset of the TRS/CSI-RS_slot of each terminal group under each cell are the same, or are terminal-specific, that is, the time domain position offset of the i-th beam of each TRS/CSI-RS can be configured differently for each terminal; when TRS/CSI-RS_beam_i_offset is configured as dedicated parameters for the cell, that is, the offset of the time domain position of the i-th beam of TRS/CSI-RS relative to the time domain position of the TRS/CSI-RS radio frame is the same; when configured as terminal group-specific, or terminal-specific, that is, the time domain position offset of the i-th beam of the TRS/CSI-RS of each terminal or each terminal group can be configured to be different.

2-2: The time domain position of the target beam of TRS/CSI-RS can be expressed as a function F14 (TRS/CSI-RS_slot TRS/CSI-RS_beam_i_offset) of the time domain position of the subframe or slot of TRS/CSI-RS, Wherein, TRS/CSI-RS_slot indicates the time domain position of the subframe or slot where the TRS/CSI-RS is located, and TRS/CSI-RS_beam_i_offset indicates the time domain position offset of the i-th beam of the TRS/CSI-RS.

The functional relationship F14 can be expressed as Y=X+offset, that is, TRS/CSI-RS_beam_i=TRS/CSI-RS_slot*the number of slots of each subframe*the number of symbols of each slot+TRS/CSI–RS_beam_i offse, or, TRS/CSI-RS_beam_i=TRS/CSI-RS_slot*the number of symbols of each slot+TRS/CSI-RS_beam_i_offset. Wherein, the TRS/CSI-RS_slot is the same as above, which can be obtained from example 1; the TRS/CSI-RS_beam_i_offset is the same as above, that is, the time domain position of the i-th beam of the TRS/CSI-RS is jointly determined by the radio frame where the TRS/CSI-RS is located and the offset of the i-th beam of the TRS/CSI-RS.

Further, the time domain position offset TRS/CSI-RS_beam_i_offset of the i-th beam of the TRS/CSI-RS is the same as 2-1.

2-3: The time domain position of the target beam of TRS/CSI-RS can be expressed as a function F15(PF_SFN, TRS/CSI-RS_beam_i_offset) of the time domain position of the target radio frame of the paging message, determined by the target beam of TRS/CSI-RS and the time domain position of the target radio frame where the PDCCH of the paging message is located, the offset of the time domain position of the target beam of the TRS/CSI-RS, and the functional relationship can be expressed as F15(PF_SFN, TRS/CSI-RS_beam_i_offset). Wherein, PF_SFN may be expressed as the time domain position of the target radio frame.

The functional relationship F15 can be expressed as Y=X+offset, that is, TRS/CSI-RS_beam_i=PF_SFN*the number of subframes of each radio frame*the number of slots of each subframe*the number of symbols of each slot+TRS/CSI-RS_beam_i_offset. The TRS/CSI-RS_beam_i_offset is the same as above.

Further, the offset TRS/CSI-RS_beam_i_offset of the time domain position of the i-th beam of the TRS/CSI-RS is the same as the description in 2-1.

2-4: The time domain position of the target beam of TRS/CSI-RS can be expressed as the function F16 (PO_slot, TRS/CSI-RS_beam_i_offset) of the time domain position of the target monitoring subframe or slot PO of paging message, determined by the target beam of TRS/CSI-RS and the time domain position of the target monitoring subframe or slot where the PDCCH of the paging message is located, and the offset of the time domain position of the beam of the TRS/CSI-RS.

The functional relationship F16 can be expressed as Y=X+offset, that is, TRS/CSI-RS_beam_i=PO_slot*the number of slots of each subframe*the number of symbols of each slot+TRS/CSI-RS_beam_i_offset, or TRS/CSI-RS_beam_i=PO_slot*the number of symbols of each slot+TRS/CSI-RS_beam_i_offset. The TRS/CSI-RS_beam_i_offset is the same as above.

Further, the offset TRS/CSI-RS_beam_i_offset of the time domain position of the i-th beam of the TRS/CSI-RS is the same as the description in 2-1.

2-5: the target beam of TRS/CSI-RS is associated with the beam of the target monitoring position MO where the PDCCH of the paging message is located, the time domain position of the target beam of TRS/CSI-RS can be expressed as being determined by the time domain position of the index of the beam of the target monitoring position MO where the PDCCH is located, and the functional relationship can be expressed as F17(PO_MO, TRS/CSI-RS_beam_i_offset). Wherein, PO_MO may indicate the time domain position of the first effective monitoring position MO of the target PO, or the time domain position of the MO of the ith effective monitoring position of the target PO.

The functional relationship F17 can be expressed as Y=X+offset, that is, TRS/CSI-RS_beam_i=PO_MO+TRS/CSI-RS_beam_i_offset. Among them, the time domain position can be obtained by the definition in the protocol; TRS/CSI-RS_beam_i_offset is the same as above, that is, the time domain position of the i-th beam of TRS/CSI-RS is jointly determined by the time domain position of the monitoring position MO of the target PO and the offset of the i-th beam of the TRS/CSI-RS.

Further, the offset TRS/CSI-RS_beam_i_offset of the time domain position of the i-th beam of the TRS/CSI-RS is the same as the description in 2-1.

2-6: The time domain position of the target beam of TRS/CSI-RS can be expressed as being determined by the parameter of the time domain position of the target radio frame of the paging message, determined by the parameters of the time domain position of the target radio frame where PDCCH of the target beam and the paging message of TRS/CSI-RS are located, the time domain position offset of the beam of TRS/CSI-RS, and the functional relationship is expressed as F18(T, N, SFN, PF_offset, ID, TRS/CSI-RS_SFN_offset, TRS/CSI-RS_beam_i_offset). Wherein, the description of specific parameters is the same as the description of Example 1.

The functional relationship F18 can be expressed as, (TRS/CSI-RS_SFN+TRS/CSI-RS_SFN_offset) mod T=(T div N)*(ID mod N), that is, TRS/CSI-RS_beam_i=TRS/CSI-RS_SFN*the number of subframes of each radio frame*the number of slots of each subframe*the number of symbols of each slot+TRS/CSI-RS_beam_i_offset. Wherein, the parameter description is the same as that in Example 1, and the TRS/CSI-RS_beam_i_offset is the same as above.

Further, the offset TRS/CSI-RS_beam_i_offset of the time domain position of the i-th beam of the TRS/CSI-RS is the same as the description in 2-1.

2-7: The time domain position of the target beam of TRS/CSI-RS can be expressed as a function F19 (N, Ns, ID, TRS/CSI-RS_beam_i_offset) of the parameter of the time domain position of the target monitoring subframe or slot PO of the paging message, determined by the parameter of the time domain position of the target monitoring subframe or slot where the PDCCH of the paging message is located, the offset of the time domain position of the beam of TRS/CSI-RS. Wherein, the description of the parameters is the same as the description of Example 1.

The functional relationship F19 can be expressed as, TRS/CSI-RS_i_s=floor(ID/N) mod Ns+TRS/CSI-RS_beam_i_offset, that is, TRS/CSI-RS_beam_i=TRS/CSI-RS_slot*the number of slots of each subframe*the number of symbols of each slot+TRS/CSI-RS_beam_i_offset, or TRS/CSI-RS_beam_i=PO_slot*the number of symbols of each slot+TRS/CSI-RS_beam_i_offset. The TRS/CSI-RS_beam_i_offset is the same as above.

Further, the offset TRS/CSI-RS_beam_i_offset of the time domain position of the i-th beam of the TRS/CSI-RS is the same as the description in 2-1.

Figure 6:
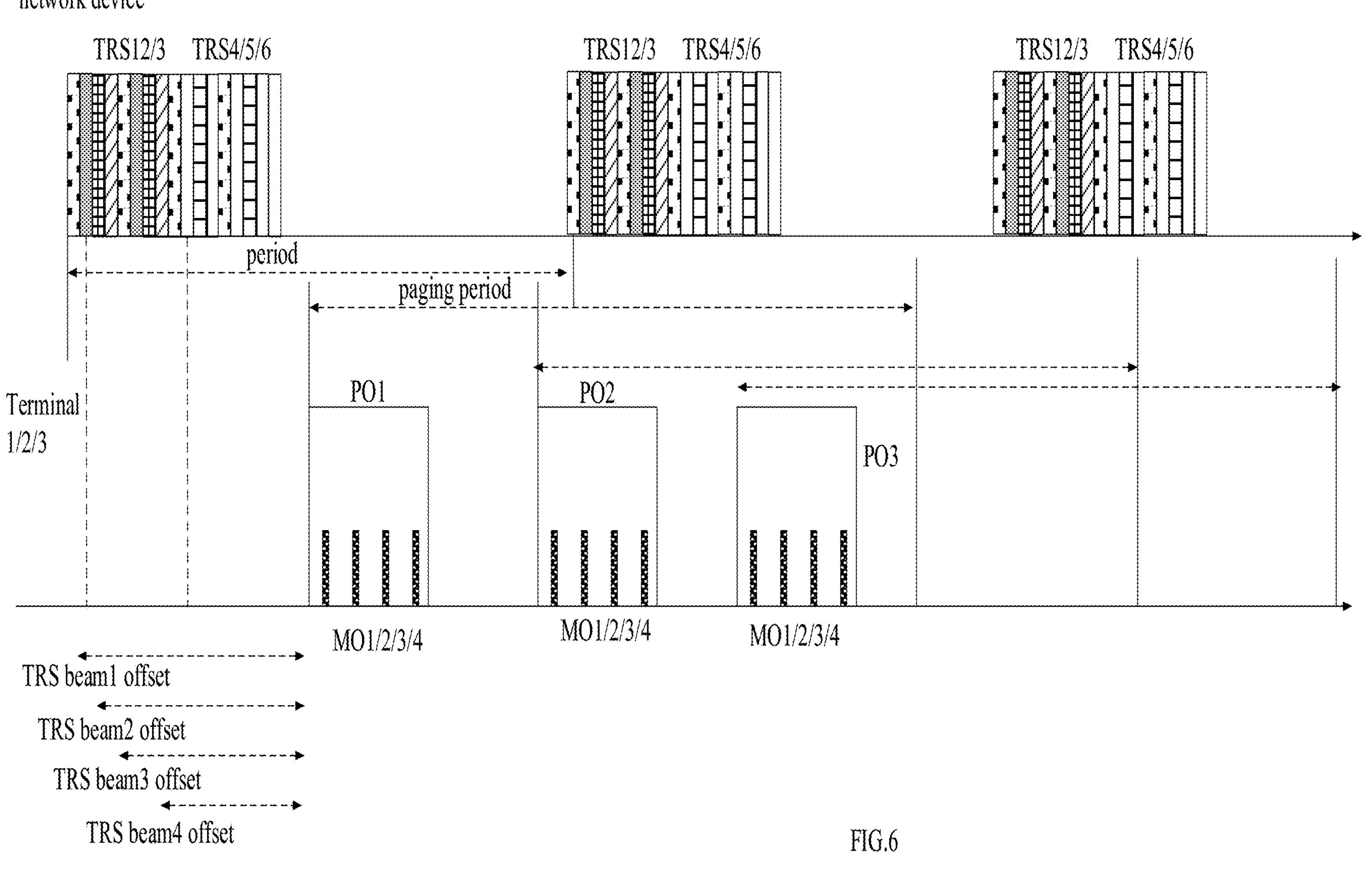

For example: as shown in FIG. 6, the time domain position of the i-th beam of TRS/CSI-RS is determined according to the time domain position of the target PO, which is configured as multiple TRS/CSI-RS resource sets and periods, and each PO is configured correspondingly one TRS/CSI-RS resource set, the time domain position offset configurations of beams from the time domain position of the i-th beam of each TRS/CSI-RS to the time domain positions of different target POs are different.

Figure 7:
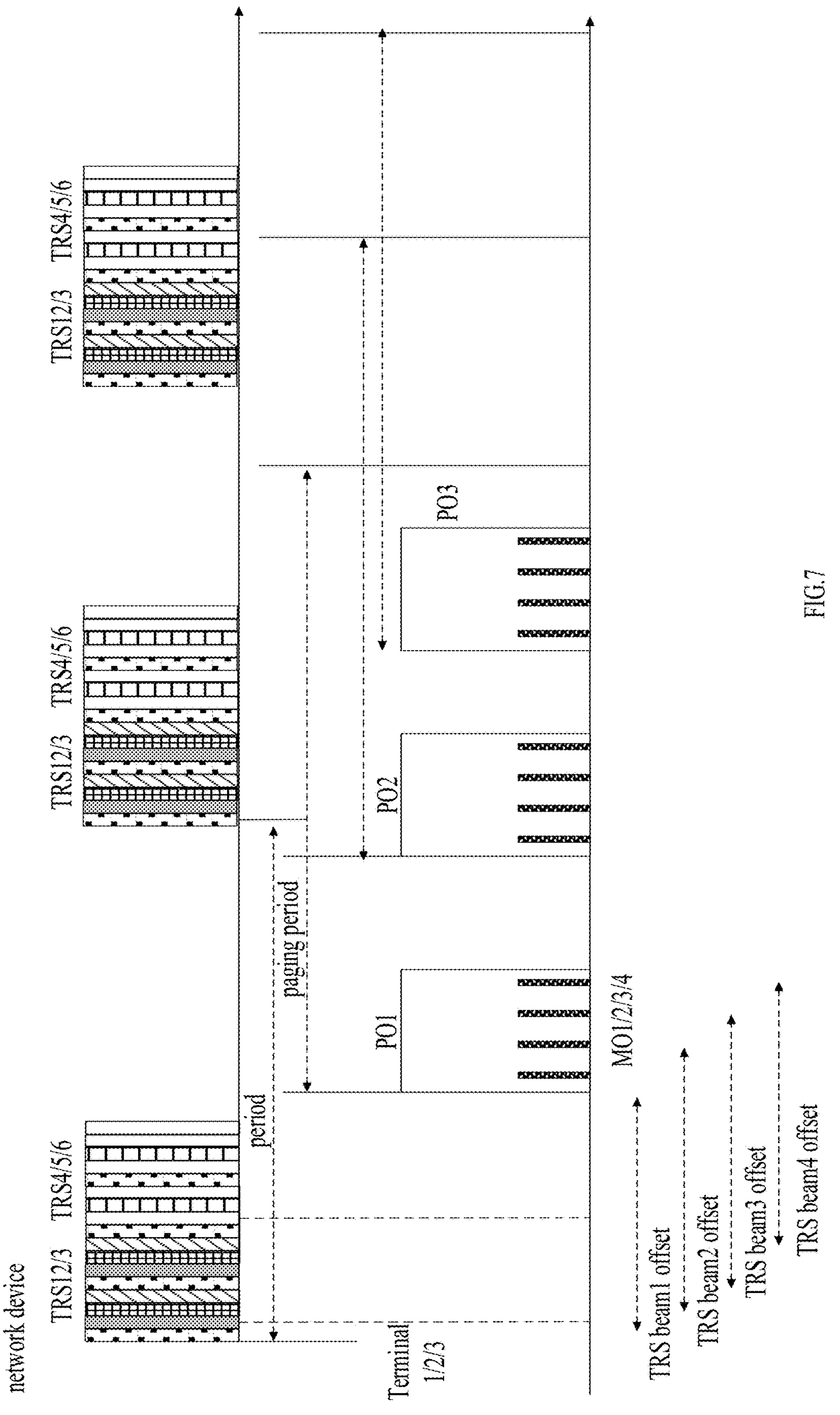

Another example: as shown in FIG. 7, the time domain position of the i-th beam of the TRS/CSI-RS is determined according to the time domain position of the target monitoring position MO of the PO, which is configured as multiple TRS/CSI-RS resource sets and periods, Each PO is correspondingly configured with one TRS/CSI-RS resource set, and the time domain position offset configuration of the beam from the time domain position of the i-th beam of each TRS/CSI-RS to the time domain position of the target monitoring position MO of different POs are different.

Step 3: The terminal receives the TRS/CSI-RS at the time domain position of the TRS/CSI-RS according to the obtained time domain position of the TRS/CSI-RS.

Example 3

This embodiment mainly describes that the time domain position of the TRS/CSI-RS is associated with the time domain positions of the PO and SSB. Specifically, it can include the following:

Step 1: The terminal receives the parameters of the configured TRS/CSI-RS signal.

In this step, the difference with embodiment 1 and 2 is that:

The target reference signal may be a synchronization signal (SSB). The target reference signal may be a signal of a reference time domain position for calculating the time domain position of the TRS/CSI-RS. The offset of the time domain position of the TRS/CSI-RS relative to the time domain position of the target reference signal may be the offset of the time domain position of the TRS/CSI-RS relative to the starting time domain position of the synchronization signal, may be the offset of the time domain position of the TRS/CSI-RS relative to the end time domain position of the synchronization signal, may be the offset of the time domain position of the TRS/CSI-RS relative to the starting position of the i-th symbol of the synchronization signal, may be the offset of the time domain position of the TRS/CSI-RS relative to the end position of the i-th symbol of the synchronization signal.

Further, if the time domain position of the target reference signal is the starting time domain position of the TRS/CSI-RS, then the end time domain position of the TRS/CSI-RS can be configured as the time domain position for sending the paging message, the time domain position for sending the paging message may be the time domain position of the PDCCH where the paging message is located, or the time domain position of the PDSCH where the paging message is located. Alternatively, the end time domain position of the TRS/CSI-RS may not be defined, depending on the terminal implementation.

Further, if the time domain position of the target reference signal is the end or starting time domain position of the TRS/CSI-RS, then the end time domain position of the TRS/CSI-RS can be configured as the time domain position for sending the paging message, the time domain position for sending the paging message is the same as above; or, the reference signal is sent periodically, and the time domain position relationship between the reference signal and the paging message is not defined.

Step 2: The terminal calculates the position of the TRS/CSI-RS according to a predefined formula.

The specific calculation method is the same as that described in Examples 1 and 2. The specific description of the time domain position of the TRS/CSI-RS is as described in step 1.

For example: as shown in FIG. 7, the time domain position of the TRS/CSI-RS is calculated according to the time domain position of the synchronization signal. The starting position of the TRS/CSI-RS is determined by the time domain position of the synchronization signal.

Figure 8:
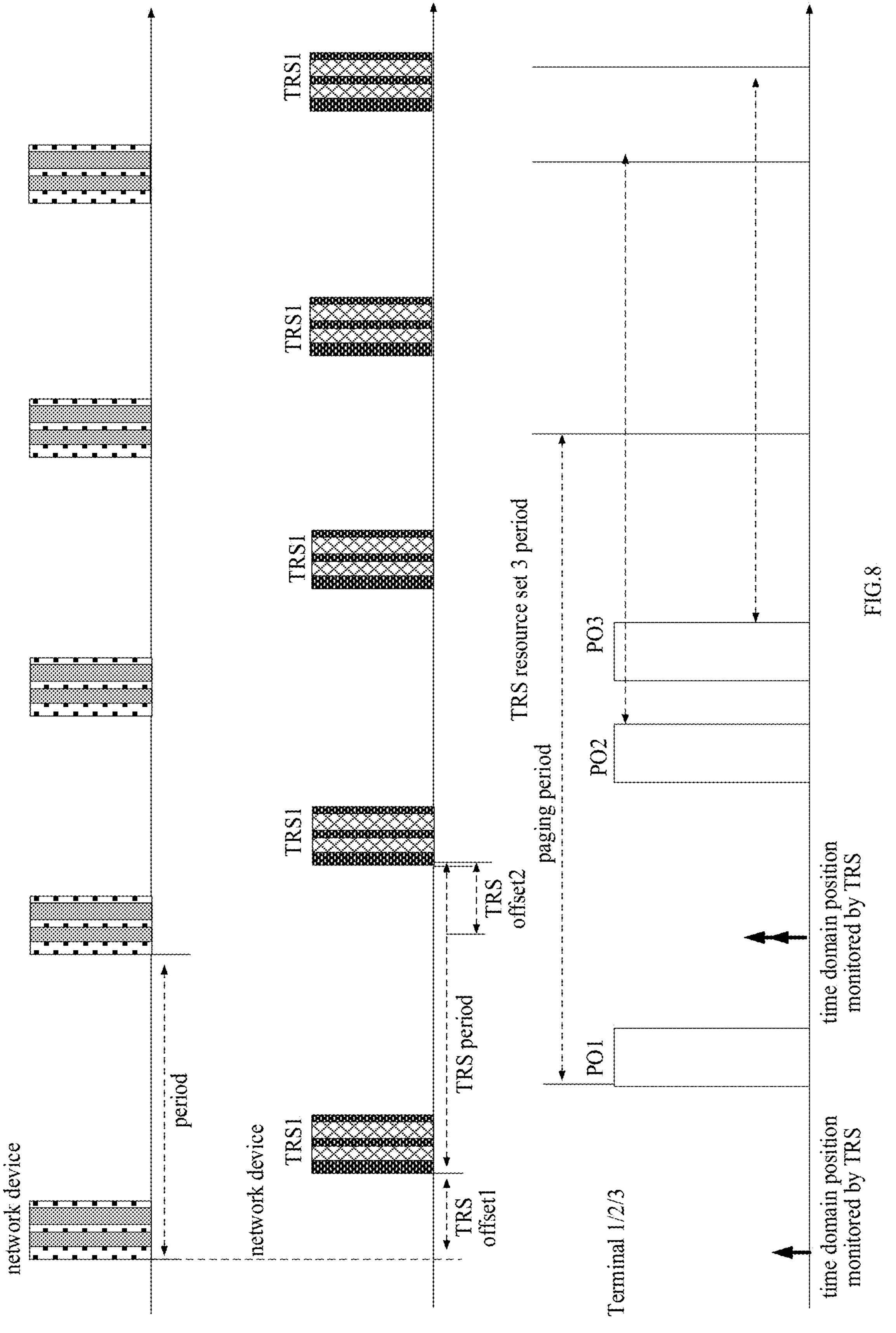
Figure 9:
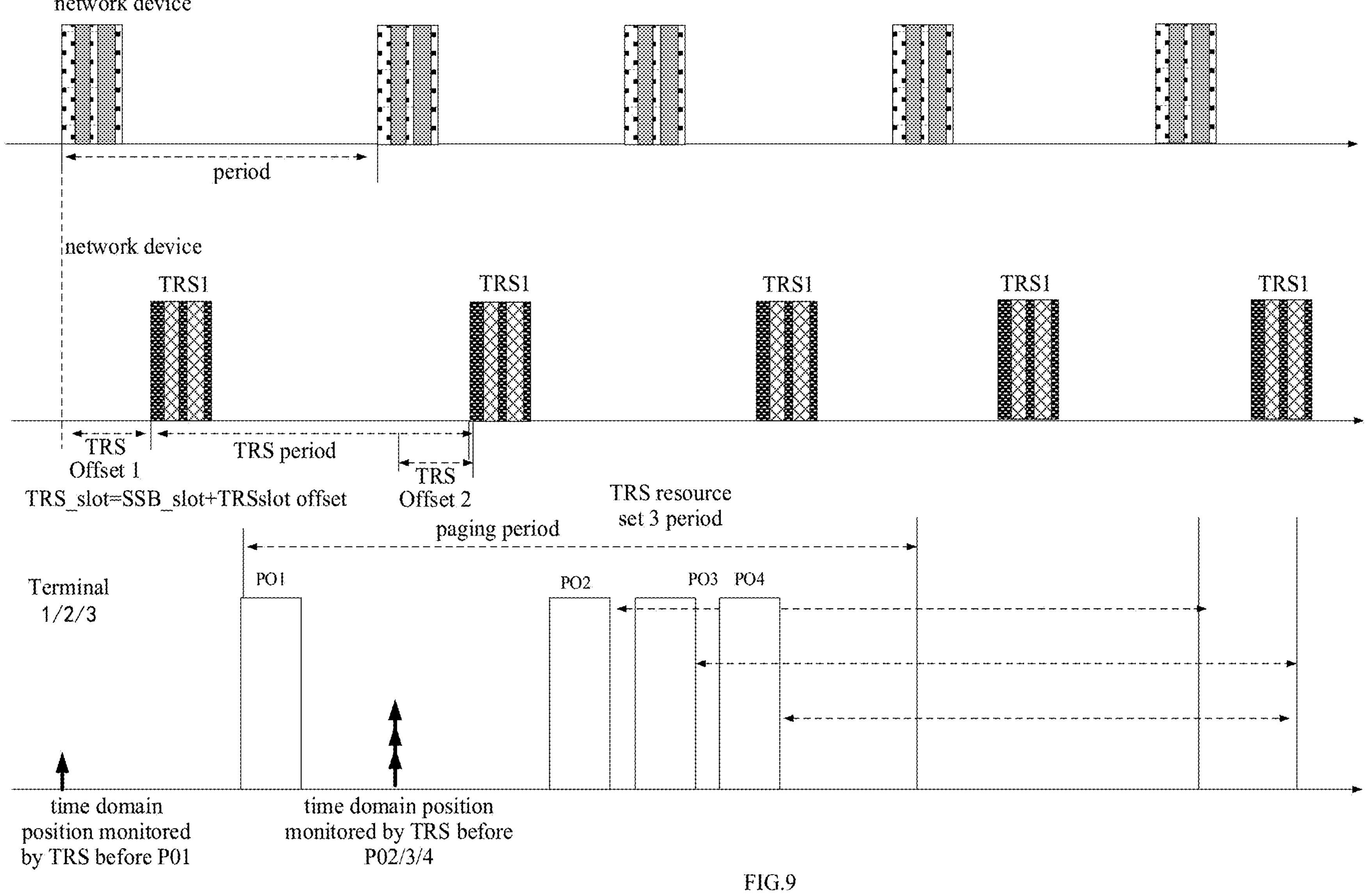

Another example: as shown in FIG. 8, the time domain position of the TRS/CSI-RS is calculated according to the time domain position of the synchronization signal and the time domain position of the paging signal. The starting position of the TRS/CSI-RS is jointly determined by the time domain position of the synchronization signal and the time domain position of the paging signal.

Step 3: The terminal receives the TRS/CSI-RS at the position according to the obtained TRS/CSI-RS position.

It should be noted that in the above description, the target reference signal is a paging message or SSB. In the above embodiment, the paging message can be replaced by at least one of SSB, TRS, CSI-RS, and PEI. The parameter and functional relationship corresponding to the paging message can be replaced by parameter and functional relationship of at least one of SSB, TRS, CSI-RS, PEI, and the SSB can be replaced by: at least one of paging message, TRS, CSI-RS, PEI, the parameter and functional relationship corresponding to the SSB may be replaced by the parameter and functional relationship of at least one of the paging message, TRS, CSI-RS, and PEI. The above TRS/CSI-RS can also be replaced by PEI, specifically, the above TRS/CSI-RS can be replaced by at least one of TRS, CSI-RS, and PEI, such as TRS and CSI-RS, or TRS and PEI, or PEI and CSI-RS, or replaced by TRS or CSI-RS or PEI. The functional relationship of TRS/CSI-RS may also be replaced by the functional relationship of PEI. Specifically, the functional relationship of TRS/CSI-RS may be replaced by a functional relationship of at least one of TRS, CSI-RS, and PEI.

Further, the above is only an example at the terminal side. The implementation of the network device can also refer to the above terminal implementation. The difference between the network device and the terminal side is that the terminal side is configured to receive signals, while the network device is configured to send signals, which will not be described here.

In the embodiment of the present disclosure, the terminal determines the time domain position of the first signal according to the time domain information of the target reference signal; the terminal receives the first signal according to the time domain position of the first signal. Since the time domain position of the first signal is determined according to the time domain information of the target reference signal, an RRC signal is not necessary to configure the time domain position of the first signal, thereby saving power consumption of the terminal.

Figure 10:
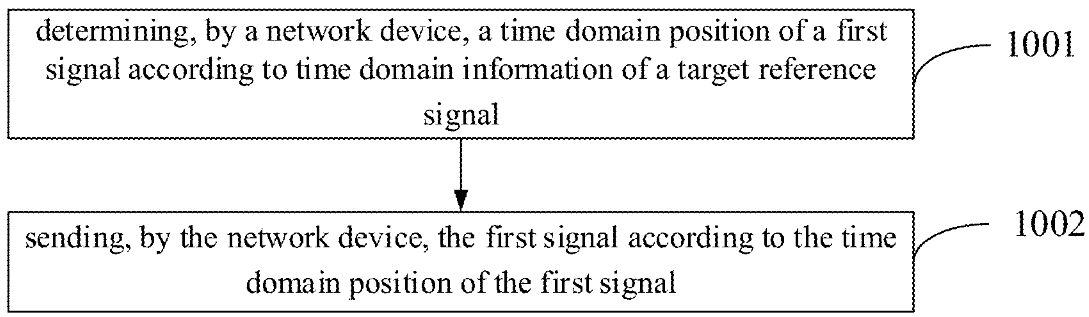
FIG. 10 is a flowchart of a signal sending method according to an embodiment of the present disclosure.

FIG. 10 is a flowchart of a signal sending method provided by an embodiment of the present disclosure. As shown in FIG. 10, it includes the following steps:

Step 1001, determining, by a network device, a time domain position of a first signal according to time domain information of a target reference signal;

Step 1002, sending, by the network device, the first signal according to the time domain position of the first signal.

Optionally, the first signal includes one of the following items:

Tracking reference signal TRS, channel state information reference signal CSI-RS, and paging early indication PEI.

Optionally, the target reference signal includes at least one of the following:

Paging message, synchronization signal block SSB, TRS, CSI-RS, PEI;

Wherein, a content included in the first signal is different from a content included in the target reference signal.

Optionally, the time domain position of the first signal has a functional relationship with the time domain information of the target reference signal.

Optionally, the functional relationship between the time domain position of the first signal and the time domain information of the target reference signal includes at least one of the following:

A first functional relationship between the time domain position of the first signal and the time domain position of the radio frame where the target reference signal is located;

A second functional relationship between the time domain position of the first signal and the time domain position of the subframe where the target reference signal is located;

A third functional relationship between the time domain position of the first signal and the time domain position of the slot where the target reference signal is located;

A fourth functional relationship between the time domain position of the first signal and the time domain position of the symbol where the target reference signal is located;

A fifth functional relationship between the time domain position of the first signal and the time domain position of the MO of the target reference signal;

A sixth functional relationship between the time domain position of the first signal and the parameter of the time domain position of the radio frame where the target reference signal is located;

A seventh functional relationship between the time domain position of the first signal and the parameter of the time domain position of the subframe where the target reference signal is located;

An eighth functional relationship between the time domain position of the first signal and the parameter of the time domain position of the slot where the target reference signal is located;

A ninth functional relationship between the time domain position of the first signal and the parameter of the time domain position of the symbol where the target reference signal is located;

A tenth functional relationship between the time domain position of the first signal and the parameter of the time domain position of the MO of the target reference signal.

Optionally, the determining, by the terminal, a time domain position of the first signal according to time domain information of the target reference signal, includes:

Determining, by the terminal, the time domain position of the first signal according to the time domain information of the target reference signal and the time domain position offset of the first signal.

Optionally, the time domain position of the first signal has a functional relationship with the time domain position offset of the first signal and the time domain information of the target reference signal.

Optionally, the functional relationship between the time domain position of the first signal and the time domain position offset of the first signal and the time domain information of the target reference signal includes at least one of the following;

An eleventh functional relationship between the time domain position of the first signal and the time domain position offset of the first signal and the time domain position of the radio frame where the target reference signal is located;

A twelfth functional relationship between the time domain position of the first signal and the time domain position offset of the first signal and the time domain position of the subframe where the target reference signal is located;

A thirteenth functional relationship between the time domain position of the first signal and the time domain position offset of the first signal and the time domain position of the slot where the target reference signal is located;

A fourteenth functional relationship between the time domain position of the first signal and the time domain position offset of the first signal and the time domain position of the symbol where the target reference signal is located;

A fifteenth functional relationship between the time domain position of the first signal and the time domain position offset of the first signal and the time domain position of the MO of the target reference signal;

A sixteenth functional relationship between the time domain position of the first signal and the time domain position offset of the first signal and the parameter of time domain position of the radio frame where the target reference signal is located;

A seventeenth functional relationship between the time domain position of the first signal and the time domain position offset of the first signal and the parameter of the time domain position of the subframe where the target reference signal is located;

An eighteenth functional relationship between the time domain position of the first signal and the time domain position offset of the first signal and the parameter of the time domain position of the slot where the target reference signal is located;

A nineteenth functional relationship between the time domain position of the first signal and the time domain position offset of the first signal and the parameter of the time domain position of the symbol where the target reference signal is located;

A twentieth functional relationship between the time domain position of the first signal and the time domain position offset of the first signal and the parameter of the time domain position of Mo of the target reference signal is located.

Optionally, the time domain position includes one of the following:

a starting time domain position, an ending time domain position, a starting position of an i-th symbol, and an ending position of a j-th symbol, wherein, i and j are the same or different positive integers.

Optionally, the method also includes:

determining, by the network device, a time domain position of a first beam of the first signal;

Wherein, the time domain position of the first beam of the first signal has a functional relationship with the time domain position offset of the first beam of the first signal and the time domain position of the first signal; or The time domain position of the first beam of the first signal has a functional relationship with the time domain information of the target reference signal; or The time domain position of the first beam of the first signal has a functional relationship with the time domain position offset of the first beam of the first signal and the time domain information of the target reference signal.

Optionally, a functional relationship between the time domain position of the first beam of the first signal and the time domain position offset of the first beam of the first signal and the time domain position of the first signal may include at least the following one item:

a twenty-first functional relationship between the time domain position of the first beam of the first signal and the time domain position offset of the first beam and the time domain position of the radio frame where the first signal is located;

a twenty-second functional relationship between the time domain position of the first beam of the first signal and the time domain position offset of the first beam and the time domain position of the subframe where the first signal is located;

a twenty-third functional relationship between the time domain position of the first beam of the first signal and the time domain position offset of the first beam and the time domain position of the slot where the first signal is located;

a twenty-fourth functional relationship between the time domain position of the first beam of the first signal and the time domain position offset of the first beam and the time domain position of the symbol where the first signal is located;

a twenty-fifth functional relationship between the time domain position of the first beam of the first signal and the time domain position offset of the first beam and the time domain position of the MO of the first signal.

Optionally, the time domain position of the first beam of the first signal having a functional relationship with the time domain information of the target reference signal includes at least one of the following:

A twenty-sixth functional relationship between the time domain position of the first beam of the first signal and the time domain position of the radio frame where the target reference signal is located;

A twenty-seventh functional relationship between the time domain position of the first beam of the first signal and the time domain position of the subframe where the target reference signal is located;

A twenty-eighth functional relationship between the time domain position of the first beam of the first signal and the time domain position of the slot where the target reference signal is located;

A twenty-ninth functional relationship between the time domain position of the first beam of the first signal and the time domain position of the symbol where the target reference signal is located;

A thirtieth functional relationship between the time domain position of the first beam of the first signal and the time domain position of the MO of the target reference signal;

A thirty-first functional relationship between the time domain position of the first beam of the first signal and the parameter of the time domain position of the radio frame where the target reference signal is located;

A thirty-second functional relationship between the time domain position of the first beam of the first signal and the parameter of the time domain position of the subframe where the target reference signal is located;

A thirty-third functional relationship between the time domain position of the first beam of the first signal and the parameter of the time domain position of the slot where the target reference signal is located;

A thirty-fourth functional relationship between the time domain position of the first beam of the first signal and the parameter of the time domain position of the symbol where the target reference signal is located;

A thirty-fifth functional relationship between the time domain position of the first beam of the first signal and the parameter of the time domain position of the MO of the target reference signal.

Optionally, the functional relationship between the time domain position of the first beam of the first signal and the time domain position offset of the first beam of the first signal and the time domain information of the target reference signal includes at least one of the following:

A thirty-sixth functional relationship between the time domain position of the first beam of the first signal and the time domain position offset of the first beam and the time domain position of the radio frame where the target reference signal is located;

A thirty-seventh functional relationship between the time domain position of the first beam of the first signal and the time domain position offset of the first beam and the time domain position of the subframe where the target reference signal is located;

A thirty-eighth functional relationship between the time domain position of the first beam of the first signal and the time domain position offset of the first beam and the time domain position of the slot where the target reference signal is located;

A thirty-ninth functional relationship between the time domain position of the first beam of the first signal and the time domain position offset of the first beam and the time domain position of the symbol where the target reference signal is located;

A fortieth functional relationship between the time domain position of the first beam of the first signal and the time domain position offset of the first beam and the time domain position of the MO of the target reference signal;

A forty-first functional relationship between the time domain position of the first beam of the first signal and the time domain position offset of the first beam and the parameter of the time domain position of the radio frame where the target reference signal is located;

A forty-second functional relationship between the time domain position of the first beam of the first signal and the time domain position offset of the first beam and the parameter of the time domain position of the subframe where the target reference signal is located;

A forty-third functional relationship between the time domain position of the first beam of the first signal and the time domain position offset of the first beam and the parameter of the time domain position of the slot where the target reference signal is located;

A forty-fourth functional relationship between the time domain position of the first beam of the first signal and the time domain position offset of the first beam and the parameter of the time domain position of the symbol where the target reference signal is located;

A forty-fifth functional relationship between the time domain position of the first beam of the first signal and the time domain position offset of the first beam and the parameter of the time domain position of the MO of the target reference signal.

Optionally, the time domain information of the target reference signal includes at least one of the following:

a time domain position of a radio frame where the target reference signal is located;

a time domain position of a subframe where the target reference signal is located;

a time domain position of a slot where the target reference signal is located;

a time domain position of a symbol where the target reference signal is located;

a time domain position of a monitoring position MO of the target reference signal;

A parameter of the time domain position of the radio frame where the target reference signal is located;

A parameter of the time domain position of the subframe where the target reference signal is located;

A parameter of the time domain position of the slot where the target reference signal is located;

A parameter of the time domain position of the symbol where the target reference signal is located;

a parameter of the time domain position of the monitoring position MO of the target reference signal.

Optionally, the time domain position of the first signal includes at least one of the following:

a time domain position of a radio frame where the first signal is located;

a time domain position of a subframe where the first signal is located;

a time domain position of a slot where the first signal is located;

a time domain position of a symbol where the first signal is located;

a time domain position of MO of the first signal.

It should be noted that this embodiment is an implementation of a network device corresponding to the embodiment shown in FIG. 2. The embodiment will not be repeated, and the same beneficial effect can also be achieved.

Figure 11:
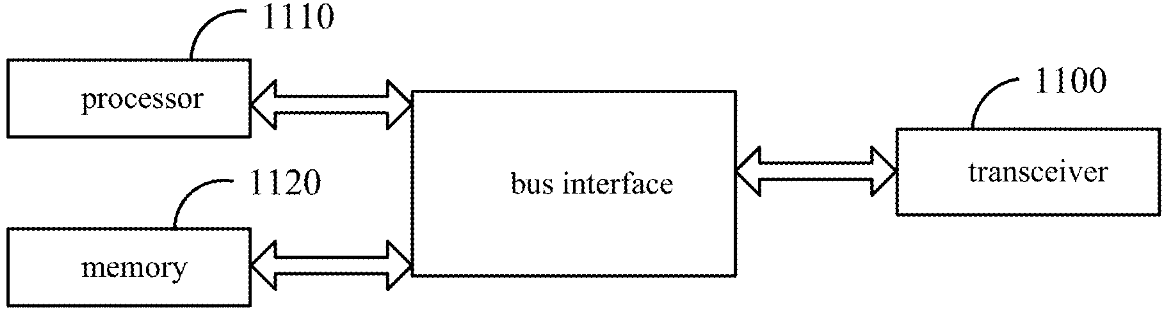
FIG. 11 is a structural diagram of a terminal according to an embodiment of the present disclosure.

FIG. 11 is a structural diagram of a terminal provided by an embodiment of the present disclosure. As shown in FIG. 11, it includes a memory 1120, a transceiver 1100, and a processor 1110:

The memory 1120 is used to store computer programs; the transceiver 1100 is used to send and receive data under the control of the processor 1110; the processor 1110 is used to read the computer programs in the memory 1120 and perform the following operations:

- determining a time domain position of a first signal according to time domain information of a target reference signal;
- receiving the first signal according to the time domain position of the first signal.

Wherein, in FIG. 11, the bus architecture may include any number of interconnected buses and bridges, specifically one or more processors represented by the processor 1110 and various circuits of the memory represented by the memory 1120 are linked together. The bus architecture can also link together various other circuits such as peripherals, voltage regulators, and power management circuits, etc., which are well known in the art and therefore will not be further described herein. The bus interface provides the interface. Transceiver 1100 may be a plurality of elements, including a transmitter and a receiver, providing means for communicating with various other devices over transmission medium, including wireless channels, wired channels, fiber optic cables, etc. For different user equipments, the user interface 1130 may also be an interface capable of connecting externally and internally to required equipment, and the connected equipment includes but not limited to a keypad, a display, a speaker, a microphone, a joystick, and the like.

The processor 1110 is responsible for managing the bus architecture and general processing, and the memory 1120 can store data used by the processor 1100 when performing operations.

Optionally, the processor 1110 may be a Central Processing Unit (CPU), Application Specific Integrated Circuit (ASIC), Field-Programmable Gate Array (FPGA) or Complex Programmable Logic Device (CPLD), the processor can also adopt a multi-core architecture.

The processor is used to execute any one of the methods provided by the embodiments of the present disclosure according to the obtained executable instructions by calling the computer program stored in the memory. The processor and memory may also be physically separated.

What needs to be explained here is that the terminal provided by the embodiment of the present disclosure can implement all the method steps implemented by the method embodiment, and can achieve the same technical effect. The part and the beneficial effect are described in detail.

Figure 12:
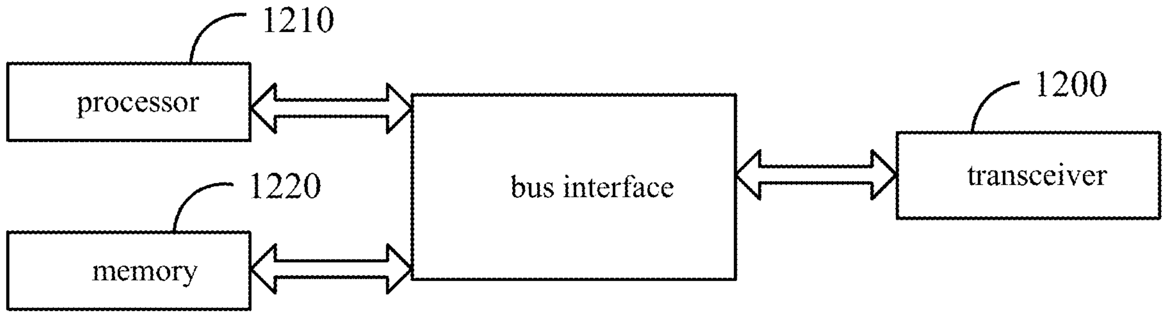
FIG. 12 is a structural diagram of a network device according to an embodiment of the present disclosure.

FIG. 12 is a structural diagram of a network device provided by an embodiment of the present disclosure. As shown in FIG. 12, it includes a memory 1220, a transceiver 1200, and a processor 1210:

The memory 1220 is used to store computer programs; the transceiver 1200 is used to send and receive data under the control of the processor 1210; the processor 1210 is used to read the computer programs in the memory 1220 and perform the following operations:

- determining a time domain position of a first signal according to time domain information of a target reference signal;
- Sending the first signal according to the time domain position of the first signal.

Wherein, in FIG. 12, the bus architecture may include any number of interconnected buses and bridges, specifically various circuits of one or more processors represented by the processor 1210 and the memory represented by the memory 1220 are linked together. The bus architecture can also link together various other circuits such as peripherals, voltage regulators, and power management circuits, etc., which are well known in the art and therefore will not be further described herein. The bus interface provides the interface. Transceiver 1200 may be a plurality of elements, including transmitters and receivers, providing means for communicating with various other devices over transmission medium, including wireless channels, wired channels, fiber optic cables, etc. For different user equipments, the user interface 1230 may also be an interface capable of connecting externally and internally to required equipment, and the connected equipment includes but not limited to a keypad, a display, a speaker, a microphone, a joystick, and the like.

The processor 1210 is responsible for managing the bus architecture and general processing, and the memory 1220 can store data used by the processor 1200 when performing operations.

Optionally, the processor 1210 may be a CPU, ASIC, FPGA or CPLD, the processor can also adopt a multi-core architecture.

The processor is used to execute any one of the methods provided by the embodiments of the present disclosure according to the obtained executable instructions by calling the computer program stored in the memory. The processor and memory may also be physically separated.

What needs to be explained here is that the network device provided by the embodiments of the present disclosure can implement all the method steps implemented by the method embodiments, and can achieve the same technical effect. The same parts and beneficial effects are described in detail.

Figure 13:
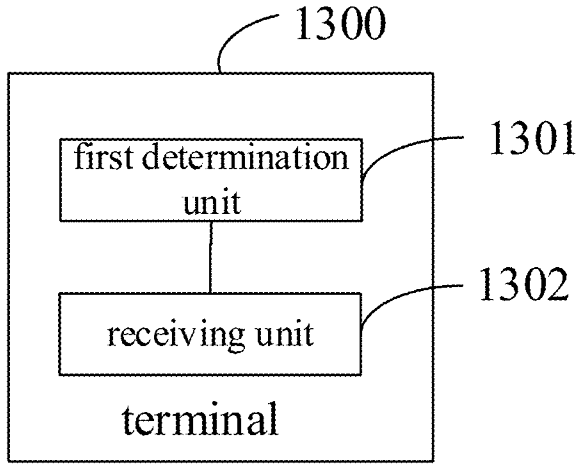
FIG. 13 is another structural diagram of a terminal according to an embodiment of the present disclosure.

FIG. 13 is a structural diagram of another terminal provided by an embodiment of the present disclosure. As shown in FIG. 13, a terminal 1300 includes:

- a first determination unit 1301, configured to determine a time domain position of a first signal according to time domain information of a target reference signal;
- a receiving unit 1302, configured to receive the first signal according to the time domain position of the first signal.

What needs to be explained here is that the terminal provided by the embodiment of the present disclosure can implement all the method steps implemented by the method embodiment, and can achieve the same technical effect. The part and the beneficial effect are described in detail.

Figure 14:
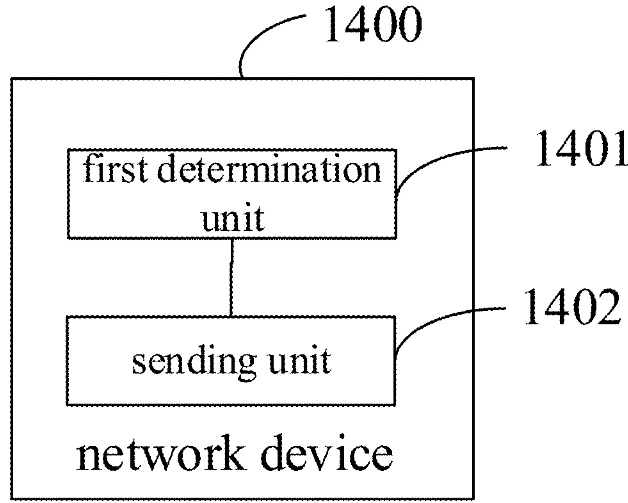
FIG. 14 is another structural diagram of a network device according to an embodiment of the present disclosure.

FIG. 14 is a structural diagram of another network device provided by an embodiment of the present disclosure. As shown in FIG. 14, a network device 1400 includes:

- a first determination unit 1401, configured to determine a time domain position of a first signal according to time domain information of a target reference signal;
- a sending unit 1402, configured to send the first signal according to the time domain position of the first signal.

What needs to be explained here is that the network device provided by the embodiments of the present disclosure can implement all the method steps implemented by the method embodiments, and can achieve the same technical effect. The same parts and beneficial effects are described in detail.

It should be noted that the division of the units in the embodiment of the present disclosure is schematic, and is only a logical function division, and there may be another division manner in actual implementation. In addition, each functional unit in each embodiment of the present disclosure may be integrated into one processing unit, each unit may exist separately physically, or two or more units may be integrated into one unit. The integrated units can be implemented in the form of hardware or in the form of software functional units.

If the integrated unit is realized in the form of a software function unit and sold or used as an independent product, it can be stored in a processor-readable storage medium. Based on such an understanding, the essence of the technical solution of the present disclosure or the part that contributes to the related art or all or part of the technical solution can be embodied in the form of a software product, and the computer software product is stored in a storage medium. Several instructions are included to make a computer device (which may be a personal computer, a server, or a network device, etc.) or a processor to execute all or part of the steps of the methods described in the various embodiments of the present disclosure. The storage media include: U disk, mobile hard disk, read-only memory (ROM), random access memory (RAM), magnetic disk or optical disk and other medium that can store program codes.

The embodiment of the present disclosure also provides a processor-readable storage medium, the processor-readable storage medium stores a computer program, and the computer program is used to enable the processor to execute the signal receiving method provided in the embodiment of the present disclosure. Alternatively, the computer program is used to enable the processor to execute the signal sending method provided by the embodiments of the present disclosure.

The processor-readable storage medium can be any available medium or data storage device that can be accessed by a processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage medium (including but not limited to magnetic disk storage, optical storage, etc.) having computer-usable program code embodied therein.

The present disclosure is described with reference to flowchart illustrations and/or block diagrams of methods, apparatus (systems), and computer program products according to embodiments of the present disclosure. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing equipment to produce a machine, such that instructions executed by the processor of the computer or other programmable data processing equipment produce means for realizing the functions specified in one or more procedures of a flowchart and/or one or more blocks of a block diagram.

These processor-executable instructions may also be stored in a processor-readable memory capable of directing a computer or other programmable data processing device to operate in a specific manner, such that the instructions stored in the processor-readable memory produce a manufacturing product, the instruction device realizes the function specified in one or more procedures of the flow chart and/or one or more blocks of the block diagram.

These processor-executable instructions can also be loaded onto a computer or other programmable data processing device, causing a series of operational steps to be performed on the computer or other programmable device to produce a computer-implemented processing, so that the instructions executed on the computer or other programmable device provide steps for implementing the functions specified in the flowchart procedure or procedures and/or block diagram procedures or blocks.

It should be noted that it should be understood that the division of the above modules is only a division of logical functions, and may be fully or partially integrated into a physical entity or physically separated during actual implementation. And these modules can all be implemented in the form of calling software through processing elements; they can also be implemented in the form of hardware; some modules can also be implemented in the form of calling software through processing elements, and some modules can be implemented in the form of hardware. For example, the determination module may be a separate processing element, or may be integrated in a chip of the device. In addition, it may be stored in the memory of the device in the form of program code, and a certain processing element of the device may call and execute the functions of the modules identified above. The implementation of other modules is similar. In addition, all or part of these modules can be integrated together, and can also be implemented independently. The processing element mentioned here may be an integrated circuit with signal processing capability. In the implementation process, each step of the above method or each module can be completed by an integrated logic circuit of hardware in the processor element or an instruction in the form of software.

For example, each module, unit, subunit or submodule may be one or more integrated circuits configured to implement the above method, for example: one or more application specific integrated circuits (ASIC), or, one or more microprocessors (digital signal processor, DSP), or, one or more field programmable gate arrays (FPGA), etc. For another example, when one of the above modules is implemented in the form of a processing element scheduling program code, the processing element may be a general-purpose processor, such as a central processing unit (CPU) or other processors that can call program codes. For another example, these modules can be integrated together and implemented in the form of a system-on-a-chip (SOC).

The terms “first”, “second” and the like in the specification and claims of the present disclosure are used to distinguish similar objects, and are not necessarily used to describe a specific order or sequence. It should be understood that the data so used may be interchanged under appropriate circumstances such that the embodiments of the disclosure described herein are practiced, for example, in sequences other than those illustrated or described herein. Furthermore, the terms "comprising" and "including", as well as any variations thereof, are intended to cover a non-exclusive inclusion, for example, a process, method, system, product or device comprising a sequence of steps or elements is not necessarily limited to the expressly listed instead, may include other steps or elements not explicitly listed or inherent to the process, method, product or apparatus. In addition, the use of "and/or" in the description and claims means at least one of the connected objects, such as A and/or B and/or C, means that it includes A alone, B alone, C alone, both A and B, both B and C, both A and C, and A, B, and C all exist. Similarly, the use of "at least one of A and B" in the present specification and claims should be understood as "A alone, B alone, or both A and B".

Obviously, those skilled in the art may make various modifications and variations of the present disclosure without departing from the spirit and scope of the present disclosure. Thus, if these modifications and variants of the present disclosure fall within the scope of the claims of the present disclosure and their equivalents, the present disclosure is also intended to include these modifications and variants.

What is claimed is:

1. A signal receiving method, comprising:

determining, by a terminal, a time domain position of a first signal according to time domain information of a target reference signal;

receiving, by the terminal, the first signal according to the time domain position of the first signal;

wherein the determining, by the terminal, a time domain position of a first signal according to time domain information of a target reference signal, includes:

determining, by the terminal, the time domain position of the first signal according to time domain information of the target reference signal and a time domain position offset of the first signal.

2. The method according to claim 1, wherein the first signal includes one of the following:

a tracking reference signal (TRS), a channel state information reference signal (CSI-RS), and paging early indication (PEI);

wherein the target reference signal includes at least one of the following:

a paging message, a synchronization signal block (SSB), a TRS, a CSI-RS or PEI;

wherein a content included in the first signal is different from a content included in the target reference signal.

3. The method according to claim 1, wherein the time domain position of the first signal has a functional relationship with the time domain information of the target reference signal.

4. The method according to claim 3, wherein the functional relationship between the time domain position of the first signal and the time domain information of the target reference signal includes at least one of the following:

a first functional relationship between the time domain position of the first signal and a time domain position of a radio frame where the target reference signal is located;

a second functional relationship between the time domain position of the first signal and a time domain position of a subframe where the target reference signal is located;

a third functional relationship between the time domain position of the first signal and a time domain position of a slot where the target reference signal is located;

a fourth functional relationship between the time domain position of the first signal and a time domain position of a symbol where the target reference signal is located;

a fifth functional relationship between the time domain position of the first signal and a time domain position of monitoring occasion (MO) of the target reference signal;

a sixth functional relationship between the time domain position of the first signal and a parameter of the time domain position of the radio frame where the target reference signal is located;

a seventh functional relationship between the time domain position of the first signal and a parameter of the time domain position of the subframe where the target reference signal is located;

an eighth functional relationship between the time domain position of the first signal and a parameter of the time domain position of the slot where the target reference signal is located;

a ninth functional relationship between the time domain position of the first signal and a parameter of the time domain position of the symbol where the target reference signal is located;

a tenth functional relationship between the time domain position of the first signal and a parameter of the time domain position of the MO of the target reference signal.

5. The method according to claim 1, wherein the time domain position of the first signal has a functional relationship with the time domain position offset of the first signal and the time domain information of the target reference signal, wherein the functional relationship between the time domain position of the first signal and the time domain position offset of the first signal and the time domain information of the target reference signal includes at least one of the following;

an eleventh functional relationship between the time domain position of the first signal and the time domain position offset of the first signal and a time domain position of a radio frame where the target reference signal is located;

a twelfth functional relationship between the time domain position of the first signal and the time domain position offset of the first signal and a time domain position of a subframe where the target reference signal is located;

a thirteenth functional relationship between the time domain position of the first signal and the time domain position offset of the first signal and a time domain position of a slot where the target reference signal is located;

a fourteenth functional relationship between the time domain position of the first signal and the time domain position offset of the first signal and a time domain position of a symbol where the target reference signal is located;

a fifteenth functional relationship between the time domain position of the first signal and the time domain position offset of the first signal and a time domain position of MO of the target reference signal;

a sixteenth functional relationship between the time domain position of the first signal and the time domain position offset of the first signal and a parameter of time domain position of the radio frame where the target reference signal is located;

a seventeenth functional relationship between the time domain position of the first signal and the time domain position offset of the first signal and a parameter of the time domain position of the subframe where the target reference signal is located;

an eighteenth functional relationship between the time domain position of the first signal and the time domain position offset of the first signal and a parameter of the time domain position of the slot where the target reference signal is located;

a nineteenth functional relationship between the time domain position of the first signal and the time domain position offset of the first signal and a parameter of the time domain position of the symbol where the target reference signal is located;

a twentieth functional relationship between the time domain position of the first signal and the time domain position offset of the first signal and a parameter of the time domain position of the MO of the target reference signal is located.

6. A signal sending method, comprising:

determining, by a network device, a time domain position of a first signal according to time domain information of a target reference signal;

sending, by the network device, the first signal according to the time domain position of the first signal;

wherein the determining, by the network device, a time domain position of a first signal according to time domain information of a target reference signal, includes:

determining, by the network device, the time domain position of the first signal according to time domain information of the target reference signal and a time domain position offset of the first signal.

7. The method according to claim 6, wherein the first signal includes one of the following:

a tracking reference signal (TRS), a channel state information reference signal (CSI-RS), and paging early indication (PEI);

wherein the target reference signal includes at least one of the following:

a paging message, a synchronization signal block (SSB), a TRS, a CSI-RS or PEI;

wherein a content included in the first signal is different from a content included in the target reference signal.

8. The method according to claim 6, wherein the time domain position of the first signal has a functional relationship with the time domain information of the target reference signal.

9. The method according to claim 8, wherein the functional relationship between the time domain position of the first signal and the time domain information of the target reference signal includes at least one of the following:

a first functional relationship between the time domain position of the first signal and a time domain position of a radio frame where the target reference signal is located;

a second functional relationship between the time domain position of the first signal and a time domain position of a subframe where the target reference signal is located;

a third functional relationship between the time domain position of the first signal and a time domain position of a slot where the target reference signal is located;

a fourth functional relationship between the time domain position of the first signal and a time domain position of a symbol where the target reference signal is located;

a fifth functional relationship between the time domain position of the first signal and a time domain position of MO of the target reference signal;

a sixth functional relationship between the time domain position of the first signal and a parameter of the time domain position of the radio frame where the target reference signal is located;

a seventh functional relationship between the time domain position of the first signal and a parameter of the time domain position of the subframe where the target reference signal is located;

an eighth functional relationship between the time domain position of the first signal and a parameter of the time domain position of the slot where the target reference signal is located;

a ninth functional relationship between the time domain position of the first signal and a parameter of the time domain position of the symbol where the target reference signal is located;

a tenth functional relationship between the time domain position of the first signal and a parameter of the time domain position of the MO of the target reference signal.

10. The method according to claim 6, wherein the time domain position of the first signal has a functional relationship with the time domain position offset of the first signal and the time domain information of the target reference signal, wherein the functional relationship between the time domain position of the first signal and the time domain position offset of the first signal and the time domain information of the target reference signal includes at least one of the following;

an eleventh functional relationship between the time domain position of the first signal and the time domain position offset of the first signal and a time domain position of a radio frame where the target reference signal is located;

a twelfth functional relationship between the time domain position of the first signal and the time domain position offset of the first signal and a time domain position of a subframe where the target reference signal is located;

a thirteenth functional relationship between the time domain position of the first signal and the time domain position offset of the first signal and a time domain position of a slot where the target reference signal is located;

a fourteenth functional relationship between the time domain position of the first signal and the time domain position offset of the first signal and a time domain position of a symbol where the target reference signal is located;

a fifteenth functional relationship between the time domain position of the first signal and the time domain position offset of the first signal and a time domain position of MO of the target reference signal;

a sixteenth functional relationship between the time domain position of the first signal and the time domain position offset of the first signal and a parameter of time domain position of the radio frame where the target reference signal is located;

a seventeenth functional relationship between the time domain position of the first signal and the time domain position offset of the first signal and a parameter of the time domain position of the subframe where the target reference signal is located;

an eighteenth functional relationship between the time domain position of the first signal and the time domain position offset of the first signal and a parameter of the time domain position of the slot where the target reference signal is located;

a nineteenth functional relationship between the time domain position of the first signal and the time domain position offset of the first signal and a parameter of the time domain position of the symbol where the target reference signal is located;

a twentieth functional relationship between the time domain position of the first signal and the time domain position offset of the first signal and a parameter of the time domain position of the MO of the target reference signal is located.

11. A network device comprising: a memory, a transceiver, and a processor, wherein:

the memory is used to store a computer program; the transceiver is used to send and receive data under the control of the processor; the processor is used to read the computer program in the memory and perform the signal sending method according to claim 6.

12. The network device according to claim 11, wherein the first signal includes one of the following:

a tracking reference signal (TRS), a channel state information reference signal (CSI-RS), and paging early indication (PEI);

wherein the target reference signal includes at least one of the following:

a paging message, a synchronization signal block (SSB), a TRS, a CSI-RS or PEI;

wherein a content included in the first signal is different from a content included in the target reference signal.

13. The network device according to claim 11, wherein the time domain position of the first signal has a functional relationship with the time domain information of the target reference signal.

14. The network device according to claim 13, wherein the functional relationship between the time domain position of the first signal and the time domain information of the target reference signal includes at least one of the following:

a first functional relationship between the time domain position of the first signal and a time domain position of a radio frame where the target reference signal is located;

a second functional relationship between the time domain position of the first signal and a time domain position of a subframe where the target reference signal is located;

a third functional relationship between the time domain position of the first signal and a time domain position of a slot where the target reference signal is located;

a fourth functional relationship between the time domain position of the first signal and a time domain position of a symbol where the target reference signal is located;

a fifth functional relationship between the time domain position of the first signal and a time domain position of monitoring occasion (MO) of the target reference signal;

a sixth functional relationship between the time domain position of the first signal and a parameter of the time domain position of the radio frame where the target reference signal is located;

a seventh functional relationship between the time domain position of the first signal and a parameter of the time domain position of the subframe where the target reference signal is located;

an eighth functional relationship between the time domain position of the first signal and a parameter of the time domain position of the slot where the target reference signal is located;

a ninth functional relationship between the time domain position of the first signal and a parameter of the time domain position of the symbol where the target reference signal is located;

a tenth functional relationship between the time domain position of the first signal and a parameter of the time domain position of the MO of the target reference signal.

15. The network device according to claim 11, wherein the time domain position of the first signal has a functional relationship with the time domain position offset of the first signal and the time domain information of the target reference signal, wherein the functional relationship between the time domain position of the first signal and the time domain position offset of the first signal and the time domain information of the target reference signal includes at least one of the following;

an eleventh functional relationship between the time domain position of the first signal and the time domain position offset of the first signal and a time domain position of a radio frame where the target reference signal is located;

a twelfth functional relationship between the time domain position of the first signal and the time domain position offset of the first signal and a time domain position of a subframe where the target reference signal is located;

a thirteenth functional relationship between the time domain position of the first signal and the time domain position offset of the first signal and a time domain position of a slot where the target reference signal is located;

a fourteenth functional relationship between the time domain position of the first signal and the time domain position offset of the first signal and a time domain position of a symbol where the target reference signal is located;

a fifteenth functional relationship between the time domain position of the first signal and the time domain position offset of the first signal and a time domain position of MO of the target reference signal;

a sixteenth functional relationship between the time domain position of the first signal and the time domain position offset of the first signal and a parameter of time domain position of the radio frame where the target reference signal is located;

a seventeenth functional relationship between the time domain position of the first signal and the time domain position offset of the first signal and a parameter of the time domain position of the subframe where the target reference signal is located;

an eighteenth functional relationship between the time domain position of the first signal and the time domain position offset of the first signal and a parameter of the time domain position of the slot where the target reference signal is located;

a nineteenth functional relationship between the time domain position of the first signal and the time domain position offset of the first signal and a parameter of the time domain position of the symbol where the target reference signal is located;

a twentieth functional relationship between the time domain position of the first signal and the time domain position offset of the first signal and a parameter of the time domain position of the MO of the target reference signal is located.

16. A terminal comprising: a memory, a transceiver, and a processor, wherein:

the memory is used to store a computer program; the transceiver is used to send and receive data under the control of the processor; the processor is used to read the computer program in the memory and perform the following operations:

determining a time domain position of a first signal according to time domain information of a target reference signal;

receiving the first signal according to the time domain position of the first signal;

wherein the determining a time domain position of a first signal according to time domain information of a target reference signal, includes:

determining the time domain position of the first signal according to time domain information of the target reference signal and a time domain position offset of the first signal.

17. The terminal according to claim 16, wherein the first signal includes one of the following:

a tracking reference signal (TRS), a channel state information reference signal (CSI-RS), and paging early indication (PEI);

wherein the target reference signal includes at least one of the following:

a paging message, a synchronization signal block (SSB), a TRS, a CSI-RS or PEI;

wherein a content included in the first signal is different from a content included in the target reference signal.

18. The terminal according to claim 16, wherein the time domain position of the first signal has a functional relationship with the time domain information of the target reference signal.

19. The terminal according to claim 18, wherein the functional relationship between the time domain position of the first signal and the time domain information of the target reference signal includes at least one of the following:

a first functional relationship between the time domain position of the first signal and a time domain position of a radio frame where the target reference signal is located;

a second functional relationship between the time domain position of the first signal and a time domain position of a subframe where the target reference signal is located;

a third functional relationship between the time domain position of the first signal and a time domain position of a slot where the target reference signal is located;

a fourth functional relationship between the time domain position of the first signal and a time domain position of a symbol where the target reference signal is located;

a fifth functional relationship between the time domain position of the first signal and a time domain position of monitoring occasion (MO) of the target reference signal;

a sixth functional relationship between the time domain position of the first signal and a parameter of the time domain position of the radio frame where the target reference signal is located;

a seventh functional relationship between the time domain position of the first signal and a parameter of the time domain position of the subframe where the target reference signal is located;

an eighth functional relationship between the time domain position of the first signal and a parameter of the time domain position of the slot where the target reference signal is located;

a ninth functional relationship between the time domain position of the first signal and a parameter of the time domain position of the symbol where the target reference signal is located;

a tenth functional relationship between the time domain position of the first signal and a parameter of the time domain position of the MO of the target reference signal.

20. The terminal according to claim 16, wherein the time domain position of the first signal has a functional relationship with the time domain position offset of the first signal and the time domain information of the target reference signal, wherein the functional relationship between the time domain position of the first signal and the time domain position offset of the first signal and the time domain information of the target reference signal includes at least one of the following;

an eleventh functional relationship between the time domain position of the first signal and the time domain position offset of the first signal and a time domain position of a radio frame where the target reference signal is located;

a twelfth functional relationship between the time domain position of the first signal and the time domain position offset of the first signal and a time domain position of a subframe where the target reference signal is located;

a thirteenth functional relationship between the time domain position of the first signal and the time domain position offset of the first signal and a time domain position of a slot where the target reference signal is located;

a fourteenth functional relationship between the time domain position of the first signal and the time domain position offset of the first signal and a time domain position of a symbol where the target reference signal is located;

a fifteenth functional relationship between the time domain position of the first signal and the time domain position offset of the first signal and a time domain position of MO of the target reference signal;

a sixteenth functional relationship between the time domain position of the first signal and the time domain position offset of the first signal and a parameter of time domain position of the radio frame where the target reference signal is located;

a seventeenth functional relationship between the time domain position of the first signal and the time domain position offset of the first signal and a parameter of the time domain position of the subframe where the target reference signal is located;

an eighteenth functional relationship between the time domain position of the first signal and the time domain position offset of the first signal and a parameter of the time domain position of the slot where the target reference signal is located;

a nineteenth functional relationship between the time domain position of the first signal and the time domain position offset of the first signal and a parameter of the time domain position of the symbol where the target reference signal is located;

a twentieth functional relationship between the time domain position of the first signal and the time domain position offset of the first signal and a parameter of the time domain position of the MO of the target reference signal is located.

* * * * *